US011516782B2

(12) United States Patent
Takeda et al.

(10) Patent No.: US 11,516,782 B2
(45) Date of Patent: Nov. 29, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 180 days.

(21) Appl. No.: 16/958,448

(22) PCT Filed: Dec. 27, 2017

(86) PCT No.: PCT/JP2017/047133
§ 371 (c)(1),
(2) Date: Jun. 26, 2020

(87) PCT Pub. No.: WO2019/130521
PCT Pub. Date: Jul. 4, 2019

(65) Prior Publication Data
US 2021/0058919 A1 Feb. 25, 2021

(51) Int. Cl.
H04L 12/28 (2006.01)
H04W 72/04 (2009.01)
H04L 1/00 (2006.01)
H04L 1/18 (2006.01)

(52) U.S. Cl.
CPC ....... *H04W 72/0413* (2013.01); *H04L 1/0068* (2013.01); *H04L 1/1812* (2013.01); *H04W 72/0446* (2013.01)

(58) Field of Classification Search
CPC ..................................................... H04L 12/28

USPC ......................................................... 370/329
See application file for complete search history.

(56) References Cited

U.S. PATENT DOCUMENTS

2017/0359148 A1* 12/2017 Richardson ........... H04L 1/0068

FOREIGN PATENT DOCUMENTS

WO 2017078147 A1 5/2017

OTHER PUBLICATIONS

Extended European Search Report issued in counterpart European Patent Application No. 17936352.8, dated Jul. 13, 2021 (7 pages).
Nokia, Nokia Shanghai Bell; "On remaining details of short PUCCH for UCI of more than 2 bits"; 3GPP TSG RAN WG1 Meeting 91, R1-1720008; Reno, USA; Nov. 27-Dec. 1, 2017 (4 pages).
Nokia, Nokia Shanghai Bell; "On the remaining details of long PUCCH for UCI more than 2 bits"; 3GPP TSG RAN WG1 #91, R1-1720011; Reno, Nevada, USA; Nov. 27-Dec. 1, 2017 (12 pages).

(Continued)

*Primary Examiner* — Dang T Ton
(74) *Attorney, Agent, or Firm* — Osha Bergman Watanabe & Burton LLP

(57) ABSTRACT

An aspect of a user terminal of the present invention includes a transmitting section that transmits a plurality of pieces of uplink control information (UCI) corresponding to a plurality of communications by using an uplink control channel or an uplink shared channel, and a control section that controls a transmission of at least a part of the plurality of pieces of UCI, based on a format of the uplink control channel or a maximum coding rate configured for the uplink shared channel when transmission timings of the plurality of pieces of UCI overlap each other.

4 Claims, 16 Drawing Sheets

(56) References Cited

OTHER PUBLICATIONS

3GPP TS 36.300 V8.12.0 "3rd Generation Partnership Project; Technical Specification Group Radio Access Network Evolved Universal Terrestrial Radio Access (E-UTRA) and Evolved Universal Terrestrial Radio Access Network (EUTRAN); Overall description; Stage 2 (Release 8)" Mar. 2010 (149 pages).
3GPP TSG RAN WG1 Meeting NR#3; R1-1715768 "UCI multiplexing of different usage scenario" ETRI; Nagoya, Japan; Sep. 18-21, 2017 (3 pages).
International Search Report issued in International Application No. PCT/JP2017/047133, dated Mar. 27, 2018 (3 pages).
Written Opinion issued in International Application No. PCT/JP2017/047133; dated Mar. 27, 2018 (3 pages).
Office Action issued in the counterpart Japanese Patent Application No. 2019-561508, dated Feb. 8, 2022 (8 pages).

* cited by examiner

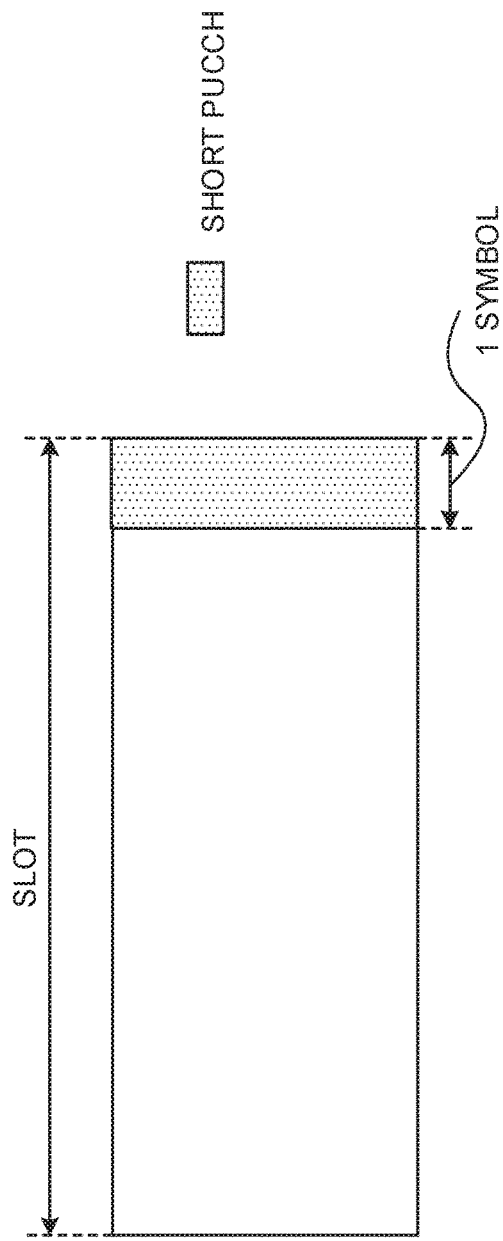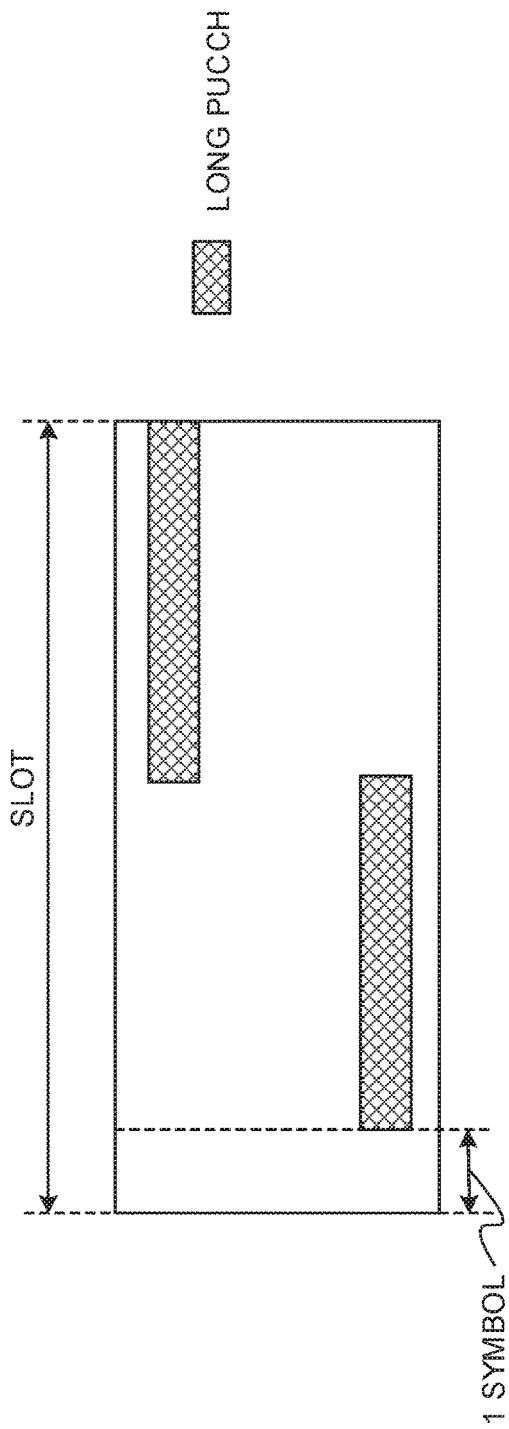
FIG. 1A
FIG. 1B

| PUCCH FORMAT | THE NUMBER OF SYMBOLS IN SLOT | THE NUMBER OF BITS |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

FIG. 2

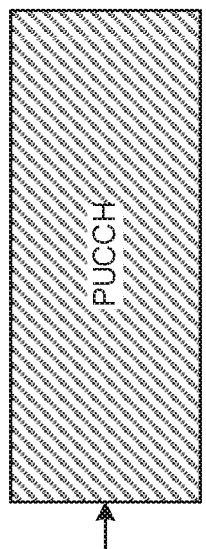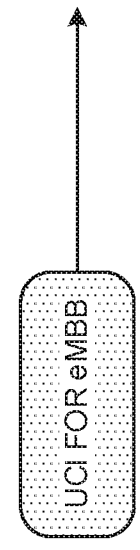
FIG. 3A
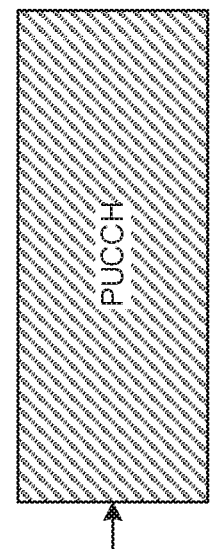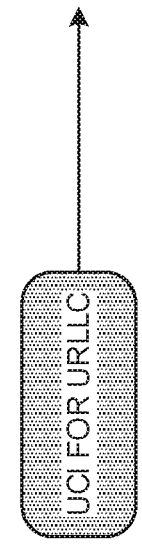
FIG. 3B

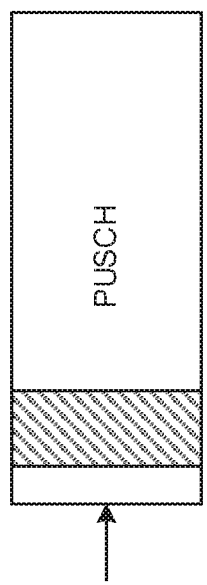
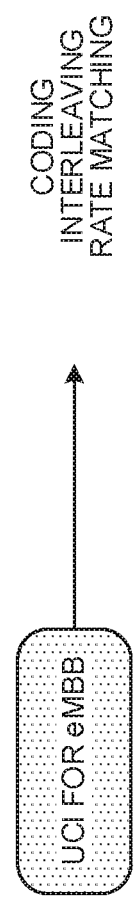
FIG. 7A
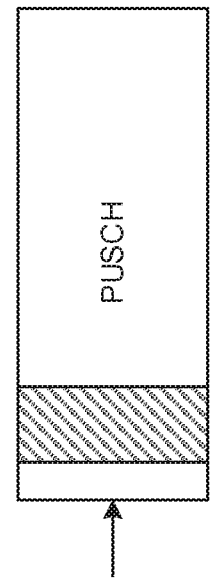
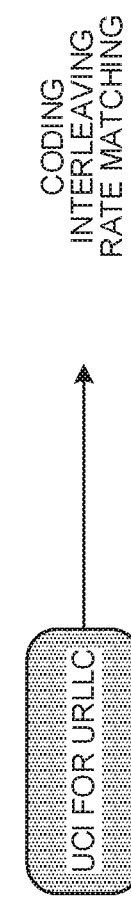
FIG. 7B

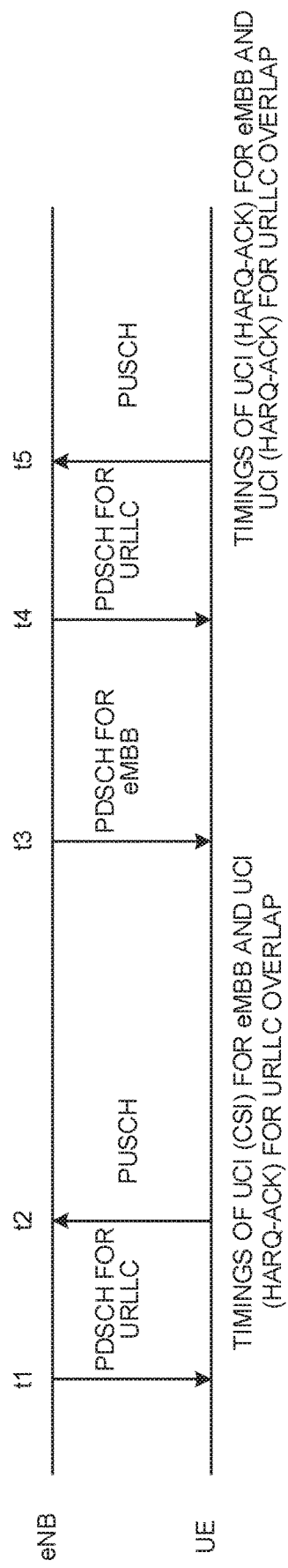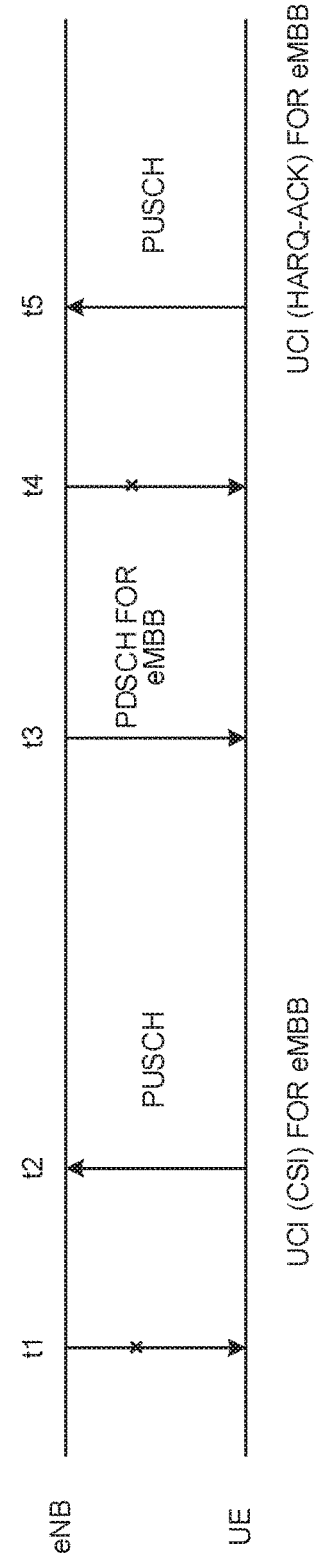

USER TERMINAL AND RADIO COMMUNICATION METHOD

TECHNICAL FIELD

The present invention relates to a user terminal and a radio communication method in next-generation mobile communication systems.

BACKGROUND ART

In UMTS (Universal Mobile Telecommunications System) networks, the specifications of long-term evolution (LTE) have been drafted for the purpose of further increasing high speed data rates, providing lower latency, and so on (see Non-Patent Literature 1). Moreover, aiming at further wider bandwidth and higher speed than LTE, successor systems of LTE (referred to as, for example, LTE-A (LTE-Advanced), FRA (Future Radio Access), 4G, 5G, 5G+(plus), NR (New RAT), LTE Rel. 14, LTE Rel. 15 or later versions) are also under study.

In existing LTE systems (for example, LTE Rel. 8 to Rel. 13), downlink (DL) and/or uplink (UL) communications are carried out using 1 ms subframes (also referred to as "transmission time intervals (TTIs)" or the like). The subframe is a transmission time unit of one data packet coded by channel coding, and is a processing unit of scheduling, link adaptation, retransmission control (HARQ (Hybrid Automatic Repeat reQuest)), and so on.

In the existing LTE systems (for example, LTE Rel. 8 to Rel. 13), a user terminal transmits uplink control information (UCI) by using an uplink control channel (for example, PUCCH (Physical Uplink Control Channel)) or an uplink shared channel (for example, PUSCH (Physical Uplink Shared Channel)). A structure (format) of the uplink control channel may be referred as a PUCCH format (PF) or the like.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, 5G or NR), expected are, for example, a plurality of communications (also referred to as use-cases, services, communication types, and the like) different in a requirement, such as high speed and large capacity (for example, eMBB (enhanced Mobile Broad Band), massive terminals (for example, massive MTC (massive Machine Type Communication), and ultra reliable and low latency (for example, URLLC (Ultra Reliable and Low Latency Communications)). Note that the requirement may be related to, for example, at least one of latency, reliability, capacity, speed, and performance.

In the future radio communication systems, the user terminal is expected to transmit a plurality of pieces of UCI corresponding to the plurality of communications (for example, eMBB and URLLC) different in the requirement.

However, in a case that the user terminal transmits the plurality of pieces of UCI, resulting from the transmission of the plurality of pieces of UCI being not appropriately controlled, the requirement for at least one communication may not be met and/or usage efficiency of a radio resource may be decreased.

The present invention has been made in light of the foregoing, and has an object to provide a user terminal and radio communication method capable of appropriately controlling transmission of a plurality of pieces of UCI corresponding to a plurality of communications (for example, eMBB and URLLC) different in a requirement.

Solution to Problem

An aspect of a user terminal of the present invention includes a transmitting section that transmits a plurality of pieces of uplink control information (UCI) corresponding to a plurality of communications by using an uplink control channel or an uplink shared channel, and a control section that controls a transmission of at least a part of the plurality of pieces of UCI, based on a format of the uplink control channel or a maximum coding rate configured for the uplink shared channel when transmission timings of the plurality of pieces of UCI overlap each other.

Advantageous Effects of Invention

According to the present invention, it is possible to appropriately control transmission of a plurality of pieces of UCI corresponding to a plurality of communications (for example, eMBB and URLLC) different in a requirement.

BRIEF DESCRIPTION OF DRAWINGS

FIGS. 1A and 1B are diagrams to show structure examples of an uplink control channel in future radio communication systems;

FIG. 2 is a diagram to show an example of a PUCCH format in the future radio communication systems;

FIGS. 3A and 3B are diagrams to show examples of transmission control of UCI in a user terminal according to Aspect 1.1;

FIGS. 7A and 7B are diagrams to show examples of transmission control of UCI in a user terminal according to Aspect 2.1;

FIGS. 8A and 8B are diagrams to show examples of scheduling control in a radio base station according to Aspect 2.1;

DESCRIPTION OF EMBODIMENTS

Figure 4A:
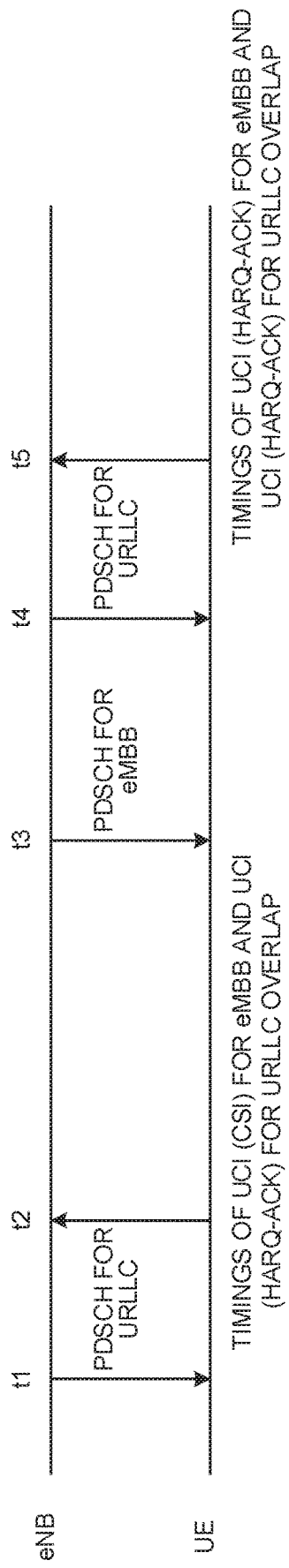
FIGS. 4A and 4B are diagrams to show examples of scheduling control in a radio base station according to Aspect 1.1.

For future radio communication systems (for example, LTE Rel. 15 or later versions, 5G, NR, and the like), a study is underway to transmit UCI by using an uplink control channel (for example, PUCCH) or an uplink shared channel (for example, PUSCH) having a plurality of formats different in at least a duration (for example, a NR PUCCH format (NR PF), also simply referred to as a PUCCH format).

FIGS. 1A and 1B are diagrams to show an example of a PUCCH in the future radio communication systems. FIG. 1A shows a PUCCH (a short PUCCH) constituted of a relatively small number of symbols (duration, for example, one to two symbols). FIG. 1B shows a PUCCH (a long PUCCH or a second uplink control channel) constituted of a larger number of symbols (duration, for example, 4 to 14 symbols) than that of the short PUCCH.

As shown in FIG. 1A, the short PUCCH may be mapped in the last certain number of symbols (for example, 1 to 2 symbols) of a slot. Note that the symbols in which the short PUCCH is mapped are not limited to the last of the slot, and may be the first or mid certain number of symbols in the slot. The short PUCCH is mapped in one or more frequency resources (for example, one or more PRBs). Note that the short PUCCH is located in the consecutive PRBs in FIG. 1A, but may be located in nonconsecutive PRBs.

The short PUCCH may be time division multiplexed and/or frequency division multiplexed with the uplink shared channel (hereinafter, also referred to as a PUSCH) in the slot. The short PUCCH may be time division multiplexed and/or frequency division multiplexed with a downlink shared channel (hereinafter, also referred to as a PDSCH) and/or a downlink control channel (hereinafter, also referred to as a PDCCH (Physical Downlink Control Channel) in the slot.

For the short PUCCH, a multi-carrier waveform (for example, OFDM (Orthogonal Frequency Division Multiplexing) waveform) may be used, or a single-carrier waveform (for example, DFT-s-OFDM (Discrete Fourier Transform-Spread-Orthogonal Frequency Division Multiplexing) waveform) may be used.

On the other hand, as shown in FIG. 1B, the long PUCCH may be mapped over a larger number of symbols (for example, 4 to 14 symbols) than that of the short PUCCH. The long PUCCH is not mapped in the first certain number of symbols of the slot in FIG. 1B, but may be mapped in the first certain number of symbols.

The long PUCCH may be frequency division multiplexed with the PUSCH in the slot. The long PUCCH may be time division multiplexed with the PDCCH in the slot. The long PUCCH may be mapped in the slot the same as the short PUCCH. For the long PUCCH, a single-carrier waveform (for example, DFT-s-OFDM waveform) may be used, or a multi-carrier waveform (for example, OFDM waveform) may be used.

As shown in FIG. 1B, for the long PUCCH, a frequency hopping may be adopted every certain duration (for example, mini- (sub-) slot) in the slot. A timing of the frequency hopping may be defined based on a duration (length) of the long PUCCH.

FIG. 2 is a diagram to show an example of a PUCCH format in the future radio communication systems. FIG. 2 shows a plurality of PUCCH formats (NR PUCCH formats) which are different in the number of symbols and/or the number of bits of the UCI. Note that the PUCCH formats shown in FIG. 2 are merely examples, and contents and numbers of PUCCH formats 0 to 4 are not limited to those shown in FIG. 2.

For example, in FIG. 2, PUCCH format 0 is a short PUCCH for the UCI of up to 2 bits (for example, FIG. 1A), and also referred to as a sequence-based short PUCCH or the like. The short PUCCH conveys the UCI of up to 2 bits (for example, a HARQ-ACK and/or a scheduling request (SR)) on 1 or 2 symbols.

PUCCH format 1 is a long PUCCH for the UCI of up to 2 bits (for example, FIG. 1B). The long PUCCH conveys the UCI of up to 2 bits on 4 to 14 symbols. For PUCCH format 1, a plurality of user terminals may be code division multiplexed (CDM) in the same PRB by, for example, block-wise spreading in a time domain by using a cyclic shift (CS) and/or an orthogonal cover code (OCC).

PUCCH format 2 is a short PUCCH for the UCI of more than 2 bits (for example, FIG. 1A). The short PUCCH conveys the UCI of more than 2 bits on 1 or 2 symbols.

PUCCH format 3 or 4 is a long PUCCH for the UCI of more than 2 bits (for example, FIG. 1B). Block-wise spreading may not be applied to PUCCH format 3, and block-wise spreading may be applied to PUCCH format 4. For PUCCH format 4, an orthogonal sequence (also referred to as orthogonal sequences, OCC or the like) of a certain length may be used to multiplex the UCI of a plurality of user terminals.

Note that for the PUCCH formats (PF) described above, the user terminal may be notified, through higher layer signaling, of at least one of an index of the first symbol, the number of symbols, an index of the first PRB, the number of PRBs (for example, in a case of PF 2 or PF 3), whether or not the frequency hopping is applied, an index of the CS (for example, in the case of PF 2 or PF 3), an index of the OCC (for example, in a case of PF 1 or PF 4), and the length of the OCC (for example, in a case of PF 4).

For the future radio communication systems described above, a study is underway to notify the user terminal of (configure the user terminal with) a maximum coding rate for the UCI related to a certain PUCCH format (for example, each of PFs 2, 3, and 4) through higher layer signaling.

Here, in the future radio communication systems described above (for example, 5G, 5G+, and NR), an identical user terminal is expected to perform, for example, a plurality of communications (also referred to as use-cases, services, communication types, and the like) different in a requirement, such as high speed and large capacity (for example, eMBB), massive terminals (for example, massive MTC), and ultra reliable and low latency (for example, URLLC). Note that the requirement may be related to, for example, at least one of latency, reliability, capacity, speed, and performance.

In the future radio communication systems, the user terminal is expected to transmit a plurality of pieces of UCI corresponding to the plurality of communications (for example, eMBB and URLLC) different in the requirement. However, in a case that the user terminal transmits the plurality of pieces of UCI, resulting from the transmission of the plurality of pieces of UCI being not appropriately controlled, the requirement for at least one communication may not be met and/or usage efficiency of a radio resource may be decreased.

Then, the inventors of the present invention studied a method for appropriately controlling transmission of a plurality of pieces of UCI corresponding to a plurality of communications (for example, eMBB and URLLC) different in a requirement, and have achieved the present invention. Hereinafter, descriptions are given of transmission control of a plurality of pieces of UCI by using the PUCCH (Aspect 1), transmission control of a plurality of pieces of UCI by using the PUSCH (Aspect 2), and transmission control of a plurality of pieces of UCI in a case that simultaneous transmission of the PUCCH and PUSCH is allowed or in a case that simultaneous transmission of a plurality of PUCCHs or PUSCHs is allowed (Aspect 3).

Hereinafter, the present embodiment will be described in detail. The "UCI" in the present embodiment may include at least one of the scheduling request (SR), acknowledgment information for downlink data (downlink shared channel (for example PDSCH (Physical Downlink Shared Channel)))(a HARQ-ACK (Hybrid Automatic Repeat reQuest-Acknowledge, ACK or NACK (Negative ACK))), and channel state information (CSI).

In the present embodiment, the CSI may include a plurality of parts. A first part (CSI part 1) of the CSI may be, for example, information having a relatively small number of bits such as a rank indicator (RI). A second part (CSI part 2) of the CSI may be information defined based on CSI part 1 (for example, information having the number of bits that is relatively large such as a channel quality indicator (CQI)).

The CSI may be any of CSI periodically reported (periodic CSI), CSI semi-persistently reported (semi-persistent CSI), or CSI aperiodically reported (aperiodic CSI).

In the present embodiment, a plurality of pieces of UCI respectively corresponding to a plurality of communications include, for example, the UCI for URLLC (also referred to as URLLC UCI, a first or second UCI and the like) and the UCI for eMBB (also referred to as eMBB UCI, a first or second UCI and the like), but the present embodiment is not limited to these. The plurality of pieces of UCI may be the pieces of UCI for two or more communications which are different in at least one of the use-case, the requirement, the service, a bearer to which the UCI corresponds, a logical channel to which the UCI corresponds, a coding rate which is to be applied, and the like.

(Aspect 1)

In Aspect 1, a description is given of transmission control of a plurality of pieces of UCI (for example, UCI for URLLC and UCI for eMBB) corresponding to a plurality of communications by using the PUCCH.

In Aspect 1, in a case that a PUSCH for the user terminal is not allocated at a transmission timing (duration or slot) of at least one of the plurality of pieces of UCI, the user terminal may transmit at least one of the plurality of pieces of UCI by using the PUCCH.

In Aspect 1, the user terminal receives information indicating the maximum coding rate (maximum coding rate information) for the UCI transmitted by using the PUCCH. The user terminal may receive the maximum coding rate information through, for example, higher layer signaling (for example, at least one of RRC signaling, system information, RMSI (Remaining Minimum System Information), and broadcast information) and/or physical layer signaling (for example, downlink control information (DCI)).

Note that in the following description, a phrase "configuring the maximum coding rate" may mean that the user terminal receives the maximum coding rate information and is enabled to use a maximum coding rate indicated by the maximum coding rate information.

The maximum coding rate concerning a certain PUCCH format may be configured for the user terminal. For example, the user terminal may receive the above maximum coding rate information concerning each of the PUCCH formats used to transmit the UCI of more than 2 bits (for example, PUCCH formats 2, 3, and 4 in FIG. 2).

The maximum coding rate for the above certain PUCCH format described above may be configured for the user terminal for each communication. For example, the maximum coding rate for the certain PUCCH format may be configured separately for the UCI for eMBB and the UCI for URLLC. In this case, the user terminal may receive the maximum coding rate information indicating the maximum coding rates for both the UCI for eMBB and the UCI for URLLC concerning the certain PUCCH format. Alternatively, the user terminal may receive separately the maximum coding rate information indicating the maximum coding rate for the UCI for eMBB and the maximum coding rate information indicating the maximum coding rate for the UCI for URLLC, concerning a certain PUCCH format.

In Aspect 1, the user terminal controls transmission of at least one of the plurality of pieces of UCI (for example, UCI for URLLC and/or UCI for eMBB) by using the PUCCH, based on the maximum coding rate indicated by the maximum coding rate information.

Specifically, the user terminal may, at a timing (duration or slot), control transmission of the UCI (for example, any of UCI for URLLC and UCI for eMBB) for a single communication by using the PUCCH (Aspect 1.1), or may control transmission of a plurality of pieces of UCI (for example, both UCI for URLLC and UCI for eMBB) by using the PUCCH (Aspect 1.2).

(Aspect 1.1)

In Aspect 1.1, a description is given of transmission control of UCI in a case of transmitting at least a portion of the UCI (for example, any of UCI for URLLC and UCI for eMBB) for a single communication by using the PUCCH at a timing (duration or slot).

FIGS. 3A and 3B are diagrams to show examples of transmission control of the UCI in the user terminal according to Aspect 1.1. FIG. 3A shows an example of the transmission control of the UCI for eMBB by using the PUCCH at a timing. FIG. 3B shows an example of the transmission control of the UCI for URLLC by using the PUCCH at a timing.

In FIGS. 3A and 3B, each of the UCI for eMBB and UCI for URLLC may include, for example, at least one of the SR, the HARQ-ACK, and the CSI (that may include CSI part 1 and CSI part 2) which are described above.

In FIG. 3A, the user terminal controls drop of a portion of the UCI for eMBB (for example, the CSI (CSI part 1 and/or CSI part 2)), based on the maximum coding rate configured concerning a certain PUCCH format (or, a certain PUCCH format and UCI for eMBB).

Specifically, in FIG. 3A, in a case that the total number of bits of the UCI for eMBB exceeds a certain threshold that is determined based on the maximum coding rate, the user terminal may drop a portion of the UCI for eMBB. Note that the total number of bits may or may not include cyclic redundancy check (CRC) bits.

In FIG. 3B, the user terminal controls drop of a portion of the UCI for URLLC (for example, the CSI (CSI part 1 and/or CSI part 2)), based on the maximum coding rate configured concerning a certain PUCCH format (or, a certain PUCCH format and UCI for URLLC).

Specifically, in FIG. 3B, in a case that the total number of bits of the UCI for URLLC exceeds a certain threshold that is determined based on the maximum coding rate, the user terminal may drop a portion of the UCI for URLLC. Note that the total number of bits may or may not include cyclic redundancy check (CRC) bits.

Here, the above certain threshold in FIGS. 3A and 3B may be determined based on, in addition to the maximum coding rate (r), at least one of the number of PRBs ($M^{PUCCH}_{RB}$), the number of symbols ($N^{PUCCH}_{symb}$), and a value ($Q_m$) based on a modulation scheme. The above certain threshold may be interpreted as a payload of the PUCCH format used to transmit the UCI for eMBB or the UCI for URLLC.

Note that in FIGS. 3A and 3B, the user terminal may select the minimum number of PRBs not more than the number of PRBs that is configured through higher layer signaling, and increment the minimum number of PRBs until the coding rate for the UCI determined based on the selected number of PRBs does not exceed the maximum coding rate configured through higher layer signaling. The above certain threshold may be determined based on the maximum number of PRBs resulting from the increment (=the number of PRBs configured through higher layer signaling).

In FIGS. 3A and 3B, the user terminal performs, on each of the UCI for eMBB and the UCI for URLLC after the drop control, at least one of coding, interleaving, and rate matching, and maps the resultant UCI to the PUCCH.

In Aspect 1.1, the transmission of a plurality of pieces of UCI (for example, both UCI for URLLC and UCI for eMBB) for different communications by use of the PUCCH at a timing may not be allowed, and the transmission of the UCI (for example, any of UCI for URLLC and UCI for eMBB) for a single communication by may be allowed. In this case, the radio base station may control the timings of the plurality of pieces of UCI by scheduling.

Figure 4B:
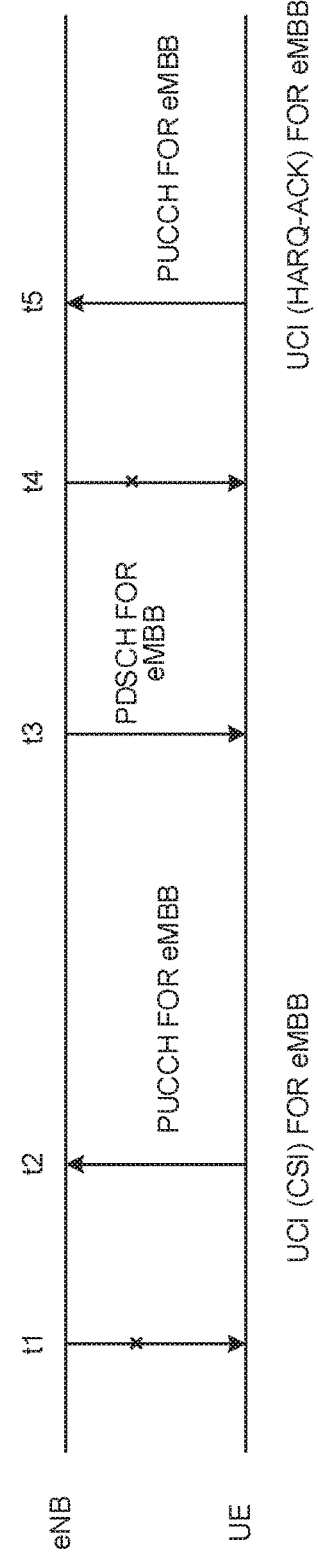

FIGS. 4A and 4B are diagrams to show examples of scheduling control in the radio base station according to Aspect 1.1. For example, in FIG. 4A, at a timing t2, a transmission timing of a HARQ-ACK for a PDSCH for URLLC (also referred to as a URLLC PDSCH, a first or second PDSCH and the like) transmitted at a timing t1 overlaps a transmission timing of CSI for eMBB.

In FIG. 4A, at a timing t5, a transmission timing of a HARQ-ACK for a PDSCH for eMBB (also referred to as an eMBB PDSCH, a first or second PDSCH and the like) transmitted at a timing t3 overlaps a transmission timing of a HARQ-ACK for a PDSCH for URLLC transmitted at a timing t4.

The radio base station may stop scheduling of the PDSCH for URLLC at the timings t1 and t4 as shown in FIG. 4B. This can eliminate, in FIG. 4B, the overlapping of the UCI for eMBB and the UCI for URLLC at the timings t2 and t5 in FIG. 4A. Of course, the overlapping of the UCI for eMBB and UCI for URLLC may be eliminated by monitoring scheduling of the PDSCH for eMBB.

In this way, the radio base station may control the scheduling of the PDSCH for URLLC, based on the transmission timing of the UCI for eMBB. Similarly, the radio base station may control the scheduling of the PDSCH for eMBB, based on the transmission timing of the UCI for URLLC.

The radio base station may control the transmission timing of the HARQ-ACK for the PDSCH for URLLC, based on the transmission timing of the UCI for eMBB. Similarly, the radio base station may control the transmission timing of the HARQ-ACK for the PDSCH for eMBB, based on the transmission timing for the URLLC. The radio base station may indicate the transmission timing of the HARQ-ACK to the user terminal by using a value of a certain field (for example, PDSCH-to-HARQ-timing-indicator field) of the DCI scheduled by way of the PDSCH for URLLC or the PDSCH for eMBB.

In Aspect 1.1, even in a case that the transmission of the UCI for a plurality of communications is expected, the UCI (for example, any of UCI for URLLC and UCI for eMBB) for a single communication is transmitted on the PUCCH at a timing in accordance with controlling by the radio base station, and thus the transmission control in the user terminal is simplified.

(Aspect 1.2)

In Aspect 1.2, a description is given of transmission control of a plurality of pieces of UCI in a case of transmitting at least a portion of the plurality of pieces of UCI (for example, both UCI for URLLC and UCI for eMBB) corresponding a plurality of communications by using the PUCCH at a timing (duration or slot).

In Aspect 1.2, in a case that the transmission timings (durations or slots) of the plurality of pieces of UCI overlap each other, transmission of at least a portion of the plurality of pieces of UCI is controlled based on the maximum coding rate configured concerning a certain PUCCH format (or, a certain PUCCH format and UCI (for example, UCI for URLLC) corresponding to higher priority communication).

(Aspect 1.2.1)

In Aspect 1.2.1, a case is described in which the user terminal concatenates and codes (joint coding) a plurality of pieces of UCI (for example, UCI for URLLC and UCI for eMBB) of which the transmission timings (durations or slots) overlap each other.

In Aspect 1.2.1, the joint coding of a plurality of pieces of UCI (for example, UCI for URLLC and UCI for eMBB) may be performed for each UCI type. The UCI type indicates a combination of at least one of the SR, the HARQ-ACK, the CSI (CSI part 1 and/or CSI part 2).

Figure 5:
FIG. 5 is a diagram to show an example of transmission control of UCI in a user terminal according to Aspect 1.2.1.

FIG. 5 is a diagram to show an example of transmission control of the UCI in the user terminal according to Aspect 1.2.1. As shown in FIG. 5, the user terminal may concatenate the UCI for URLLC and the UCI for eMBB, perform, on the concatenated UCI, at least one of coding, interleaving, and rate matching, and map the resultant UCI to the PUCCH.

Note that the PUCCH shown in FIG. 5 may be any of a PUCCH for URLLC (also referred to as URLLC PUCCH, a first PUCCH and the like), or a PUCCH for eMBB (also referred to as an eMBB PUCCH, a second PUCCH and the like).

In a case of concatenate and coding a plurality of pieces of UCI corresponding to a plurality of communications, the user terminal may combine forward the UCI for the higher priority communication. For example, in FIG. 5, the user terminal concatenates the UCI for URLLC and the UCI for eMBB, with the higher priority UCI for URLLC being forward and the lower priority UCI for eMBB being rearward.

In FIG. 5, in a case that the total number of bits of a plurality of pieces of UCI (for example, UCI for URLLC and UCI for eMBB) corresponding to a plurality of communications exceeds a certain threshold based on the maximum coding rate configured concerning a certain PUCCH format, the user terminal may drop at least a portion of the plurality of pieces of UCI, based on a certain rule. The total number of bits may or may not include the CRC bits.

For example, the certain rule may be defined based on at least one of a communication priority (for example, URLLC>eMBB) and a UCI type priority (for example, HARQ-ACK and/or SR>CSI).

Here, the above certain threshold may be determined based on, in addition to the maximum coding rate (r), at least one of the number of PRBs ($M^{PUCCH}_{RB}$), the number of symbols ($N^{PUCCH}_{symb}$), and a value ($Q_m$) based on a modulation scheme. The above certain threshold may be interpreted as a payload of the PUCCH format used to transmit the UCI for eMBB and the UCI for URLLC.

In a case that the maximum coding rate concerning the certain PUCCH format is configured to each of the UCI for eMBB and the UCI for URLLC, the above certain threshold may be determined based on the maximum coding rate for the UCI for URLLC. This is because performance conditions are strictly configured for the maximum coding rate for the UCI for URLLC as compared to the maximum coding rate for the UCI for eMBB.

In the case that the above certain threshold is determined based on the maximum coding rate for the UCI for URLLC, the user terminal selects the minimum number of PRBs not more than the number of PRBs configured through higher layer signaling. The user terminal may increment the minimum number of PRBs until the coding rate determined based on the selected number of PRBs does not exceed the configured maximum coding rate for the UCI for URLLC.

In a case that even if the coding rate is determined based on the incremented maximum number of PRBs (=the number of PRBs configured through higher layer signaling), the determined coding rate exceeds the configured maximum coding rate for the UCI for URLLC, the user terminal drops at least a portion of the UCI for eMBB and/or at least a portion of the UCI for URLLC, based on a certain rule.

Specifically, the user terminal may drop first the CSI for eMBB, and then, may drop at least a portion of the CSI for URLLC in accordance with the certain rule, until the coding rate determined based on the incremented maximum number of PRBs falls lower than the configured maximum coding rate for the UCI for URLLC. The CSI for eMBB and CSI for URLLC to be dropped may be CSI part 2, or CSI parts 1 and 2.

Alternatively, the user terminal may drop first an entire of the UCI for eMBB, and then, may drop at least a portion of the CSI for URLLC in accordance with the certain rule, until the coding rate determined based on the incremented maximum number of PRBs falls lower than the configured maximum coding rate for the UCI for URLLC. The CSI for URLLC to be dropped may be CSI part 2, or CSI parts 1 and 2.

According to Aspect 1.2.1, in the case of joint coding a plurality of pieces of UCI (for example, UCI for URLLC and UCI for eMBB) of which the transmission timings (durations or slots) overlap each other, the user terminal can appropriately control the transmission of the plurality of pieces of UCI by using the PUCCH.

(Aspect 1.2.2)

In Aspect 1.2.2, a case is described in which the user terminal separately codes (separate coding) a plurality of pieces of UCI (for example, UCI for URLLC and UCI for eMBB) of which the transmission timings (durations or slots) overlap each other. The plurality of pieces of UCI (for example, UCI for URLLC and UCI for eMBB) may be the same UCI type (for example, CSI or HARQ-ACK), or may be separately coded.

In Aspect 1.2.2, the maximum coding rate concerning a certain PUCCH format may be configured for each of a plurality of communications (for example, UCI for eMBB and UCI for URLLC). The maximum coding rate may be configured for each UCI type. For example, the maximum coding rate for an HARQ-ACK for URLLC and the maximum coding rate for the CSI for URLLC may be separately configured.

Figure 6:
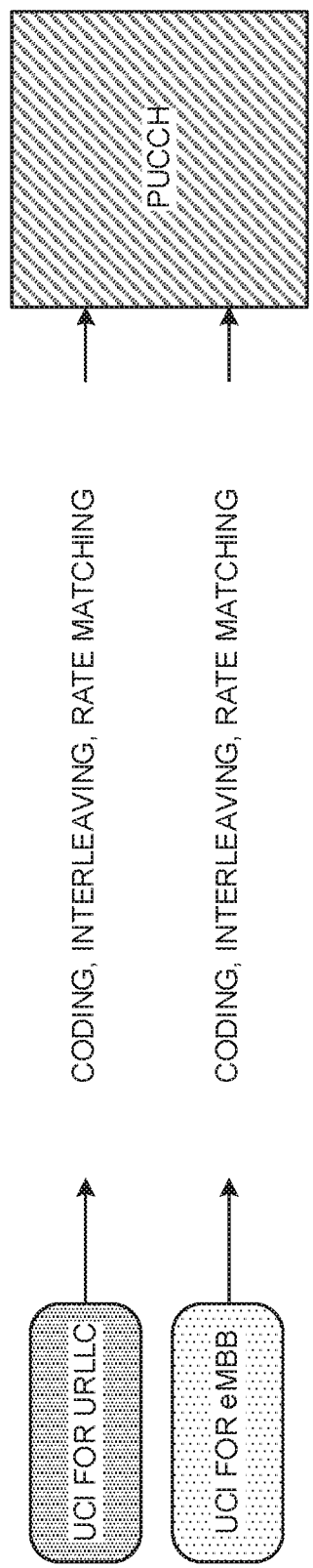
FIG. 6 is a diagram to show an example of transmission control of UCI in a user terminal according to Aspect 1.2.2.

FIG. 6 is a diagram to show an example of transmission control of the UCI in the user terminal according to Aspect 1.2.2. As shown in FIG. 6, the user terminal may separately perform, on each of the UCI for URLLC and the UCI for eMBB, at least one of coding, interleaving, and rate matching, and map the resultant UCI to the PUCCH.

Note that the PUCCH shown in FIG. 6 may be any of a PUCCH for URLLC (also referred to as a URLLC PUCCH, a first or second PUCCH and the like), or a PUCCH for eMBB (also referred to as an eMBB PUCCH, a first or second PUCCH and the like).

The user terminal may drop (or multiplex on the PUCCH), based on a certain rule, at least a portion of the plurality of pieces of UCI separately coded. For example, the certain rule may be defined based on at least one of a communication priority (for example, URLLC>eMBB) and a UCI type priority (for example, HARQ-ACK and/or SR>CSI).

<Rule 1>

For example, in Rule 1, firstly, the user terminal multiplexes the UCI for URLLC on the PUCCH. In a case that the total number of bits of the UCI for URLLC multiplexed on the PUCCH exceeds a certain threshold based on the maximum coding rate configured for the UCI for URLLC, the user terminal drops a portion of the UCI for URLLC (for example, CSI (CSI part 2, or CSI parts 1 and 2)) and does not multiplex the UCI for eMBB on the PUCCH. Note that the total number of bits may or may not include the CRC bits.

On the other hand, in a case that the total number of bits of the UCI for URLLC multiplexed on the PUCCH does not exceed the above certain threshold, the user terminal further multiplexes the UCI for eMBB on the PUCCH. In a case that the total number of bits of the UCI for eMBB exceeds a certain threshold based on the maximum coding rate configured for the UCI for eMBB, the user terminal may drop a portion of the UCI for eMBB (for example, CSI (CSI part 2, or CSI parts 1 and 2)). Note that the total number of bits may or may not include the CRC bits.

<Rule 2>

In Rule 2, firstly, the user terminal multiplexes the HARQ-ACK for URLLC on the PUCCH. In a case that the total number of bits of the HARQ-ACK for URLLC multiplexed on the PUCCH exceeds a certain threshold based on the maximum coding rate configured for the UCI for URLLC, the user terminal may bundle the HARQ-ACK for URLLC in at least one of the time, frequency, and spatial domains, and may not multiplex the UCI for eMBB on the PUCCH. Note that the total number of bits may or may not include the CRC bits.

On the other hand, in a case that the total number of bits of the HARQ-ACK for URLLC multiplexed on the PUCCH does not exceed the above certain threshold, the user terminal further multiplexes an HARQ-ACK for eMBB. In a case that the total number of bits of the HARQ-ACK for eMBB exceeds a certain threshold based on the maximum coding rate configured for the UCI for eMBB, the HARQ-ACK for eMBB may be bundled in at least one of the time, frequency, and spatial domains, or at least a portion of the UCI for eMBB may be dropped. Note that the total number of bits may or may not include the CRC bits.

In a case that the total number of bits of the HARQ-ACK for eMBB does not exceed a certain threshold based on the maximum coding rate configured for the UCI for eMBB, the user terminal may multiplex at least a portion of the CSI for URLLC (for example, CSI part 1, or CSI parts 1 and 2) not to exceed the coding rate configured for the UCI for URLLC. Note that the total number of bits may or may not include the CRC bits.

In Rule 2, the maximum coding rate configured for the UCI for URLLC may be a maximum coding rate configured for each UCI type. In other words, the total number of bits of the HARQ-ACK for URLLC multiplexed on the PUCCH may be compared with a certain threshold based on the maximum coding rate configured for the HARQ-ACK for URLLC. The total number of bits of the CSI for URLLC may be compared with a certain threshold based on the maximum coding rate configured for the CSI for URLLC.

Similarly, in Rule 2, the maximum coding rate configured for the UCI for eMBB may be a maximum coding rate configured for each UCI type. In other words, the total number of bits of the HARQ-ACK for eMBB multiplexed on the PUCCH may be compared with a certain threshold based on the maximum coding rate configured for the HARQ-ACK for eMBB.

According to Aspect 1.2.2, in the case of separate coding a plurality of pieces of UCI (for example, UCI for URLLC and UCI for eMBB) of which the transmission timings (durations or slots) overlap each other, the user terminal can appropriately control the transmission of the plurality of pieces of UCI by using the PUCCH.

(Aspect 2)

In Aspect 2, a description is given of transmission control of a plurality of pieces of UCI (for example, UCI for URLLC and UCI for eMBB) corresponding to a plurality of communications by using the PUSCH. Note that in Aspect 2, differences from Aspect 1 are mainly described.

In Aspect 2, in a case that a PUSCH for a user terminal is allocated at a transmission timing (duration or slot) of at least one of the plurality of pieces of UCI, the user terminal may transmit at least one of the plurality of pieces of UCI by using the PUSCH.

In Aspect 2, the user terminal receives information indicating the maximum coding rate (maximum coding rate information) for the UCI transmitted by using the PUSCH. The user terminal may receive the maximum coding rate information through, for example, higher layer signaling (for example, at least one of RRC signaling, system information, RMSI, and broadcast information) and/or physical layer signaling (for example, downlink control information (DCI)).

The maximum coding rate for the PUSCH may be configured for the user terminal for each communication. For example, the maximum coding rate for the PUSCH may be configured separately for the eMBB and the URLLC. In this case, the user terminal may receive the maximum coding rate information indicating the maximum coding rates for both the eMBB and the URLLC concerning the PUSCH. Alternatively, the user terminal may receive separately the maximum coding rate information indicating the maximum coding rate for the eMBB and the maximum coding rate information indicating the maximum coding rate for the URLLC, concerning the PUSCH.

The maximum coding rates for the PUSCH may be configured for the user terminal separately concerning data (including user data and/or higher layer control information) and the UCI.

In Aspect 2, the user terminal controls transmission of at least one of the plurality of pieces of UCI (for example, UCI for URLLC and/or UCI for eMBB) by using the PUSCH, based on the maximum coding rate indicated by the maximum coding rate information.

Specifically, the user terminal may, at a timing (duration or slot), control transmission of the UCI (for example, any of UCI for URLLC and UCI for eMBB) for a single communication by using the PUSCH (Aspect 2.1), or may control transmission of a plurality of pieces of UCI (for example, both UCI for URLLC and UCI for eMBB) by using the PUSCH (Aspect 2.2).

(Aspect 2.1)

In Aspect 2.1, a description is given of transmission control of UCI in a case of transmitting at least a portion of the UCI (for example, any of UCI for URLLC and UCI for eMBB) for a single communication by using the PUSCH at a timing (duration or slot).

FIGS. 7A and 7B are diagrams to show examples of transmission control of the UCI in the user terminal according to Aspect 2.1. FIG. 7A shows an example of the transmission control of the UCI for eMBB by using the PUSCH at a timing. FIG. 7B shows an example of the transmission control of the UCI for URLLC by using the PUSCH at a timing.

In FIG. 7A, the user terminal controls the transmission of the UCI for eMBB and the data by using the PUSCH. The PUSCH shown in FIG. 7A may be any of a PUSCH scheduled to the user terminal for uplink data for URLLC (URLLC uplink data (URLLC UL data)) (also referred to as PUSCH for URLLC (URLLC PUSCH), a first or second PUSCH and the like), or a PUSCH scheduled to the user terminal for uplink data for eMBB (eMBB uplink data (eMBB UL data)) (also referred to as PUSCH for eMBB (eMBB PUSCH), a first or second PUSCH and the like).

In FIG. 7A, the user terminal controls drop of a portion of the UCI for eMBB (for example, the CSI (CSI part 1 and/or CSI part 2)), based on the maximum coding rate configured concerning the PUSCH (or, the UCI for eMBB transmitted on the PUSCH).

Specifically, in FIG. 7A, in a case that the total number of bits of the UCI for eMBB exceeds a certain threshold that is determined based on the maximum coding rate, the user terminal may drop a portion of the UCI for eMBB. Note that the total number of bits may or may not include cyclic redundancy check (CRC) bits.

In FIG. 7B, the user terminal controls the transmission of the UCI for URLLC and the data by using the PUSCH. The PUSCH shown in FIG. 7B may be any of the PUSCH for URLLC or the PUSCH for eMBB.

In FIG. 7B, the user terminal controls drop of a portion of the UCI for URLLC (for example, the CSI (CSI part 1 and/or CSI part 2)), based on the maximum coding rate configured concerning the PUSCH (or, the UCI for URLLC transmitted on the PUSCH).

Specifically, in FIG. 7B, in a case that the total number of bits of the UCI for URLLC exceeds a certain threshold that is determined based on the maximum coding rate, the user terminal may drop a portion of the UCI for URLLC. Note that the total number of bits may or may not include cyclic redundancy check (CRC) bits.

Here, the above certain threshold in FIGS. 7A and 7B may be determined based on, in addition to the maximum coding rate (r), at least one of the number of PRBs ($M^{PUCCH}_{RB}$), the number of symbols ($N^{PUCCH}_{symb}$), and a value ($Q_m$) based on a modulation scheme.

In FIGS. 7A and 7B, the user terminal performs, on each of the UCI for eMBB and the UCI for URLLC after the drop control, at least one of coding, interleaving, and rate matching, and maps the resultant UCI to the PUSCH.

In Aspect 2.1, the transmission of a plurality of pieces of UCI (for example, both UCI for URLLC and UCI for eMBB) for different communications by use of the PUSCH at a timing may not be allowed, and the transmission of the UCI (for example, any of UCI for URLLC and UCI for eMBB) for a single communication may be allowed. In this case, the radio base station may control the timings of the plurality of pieces of UCI by scheduling.

FIGS. 8A and 8B are diagrams to show examples of scheduling control in the radio base station according to Aspect 2.1. For example, in FIGS. 8A and 8B, any of the PUSCH for URLLC or the PUSCH for eMBB is to be scheduled at a timing t2.

For example, in FIG. 8A, at the timing t2, a transmission timing of a HARQ-ACK for a PDSCH for URLLC transmitted at a timing t1 overlaps a transmission timing of CSI for eMBB.

In FIG. 8A, at a timing t5, a transmission timing of a HARQ-ACK for a PDSCH for eMBB transmitted at a timing t3 overlaps a transmission timing of a HARQ-ACK for a PDSCH for URLLC transmitted at a timing t4.

The radio base station may stop scheduling of the PDSCH for URLLC at the timings t1 and t4 as shown in FIG. 8B. This can eliminate, in FIG. 8B, the overlapping of the UCI for eMBB and the UCI for URLLC at the timings t2 and t5 in FIG. 8A.

In this way, the radio base station may control the scheduling of the PDSCH for URLLC, based on the transmission timing of the UCI for eMBB. Similarly, the radio base station may control the scheduling of the PDSCH for eMBB, based on the transmission timing of the UCI for URLLC.

The radio base station may control the scheduling of the PUSCH for URLLC, based on the transmission timing of the UCI for eMBB. Similarly, the radio base station may control the scheduling of the PUSCH for eMBB, based on the transmission timing of the UCI for URLLC.

The radio base station may control a trigger of an aperiodic CSI for URLLC, based on the transmission timing of the UCI for eMBB. Similarly, the radio base station may control a trigger of an aperiodic CSI for eMBB, based on the transmission timing of the UCI for URLLC.

The radio base station may control the transmission timing of the HARQ-ACK for the PDSCH for URLLC, based on the transmission timing of the UCI for eMBB. Similarly, the radio base station may control the transmission timing of the HARQ-ACK for the PDSCH for eMBB, based on the transmission timing of the UCI for the URLLC. The radio base station may indicate the transmission timing of the HARQ-ACK to the user terminal by using a value of a certain field (for example, PDSCH-to-HARQ-timing-indicator field) of the DCI scheduled by way of the PDSCH for URLLC or the PDSCH for eMBB.

In Aspect 2.1, even in a case that the transmission of the UCI for a plurality of communications is expected, the UCI (for example, any of UCI for URLLC and UCI for eMBB) for a single communication is transmitted on the PUSCH at a timing in accordance with controlling by the radio base station, and thus the transmission control in the user terminal is simplified.

(Aspect 2.2)

In Aspect 2.2, a description is given of transmission control of a plurality of pieces of UCI (for example, both UCI for URLLC and UCI for eMBB) in a case of transmitting at least a portion of the plurality of pieces of UCI corresponding a plurality of communications by using the PUSCH at a timing (duration or slot).

In Aspect 2.2, in a case that the transmission timings (durations or slots) of the plurality of pieces of UCI overlap each other, transmission of at least a portion of the plurality of pieces of UCI is controlled based on the maximum coding rate configured concerning a PUSCH (or, a PUSCH and UCI (for example, UCI for URLLC) corresponding to higher priority communication).

(Aspect 2.2.1)

In Aspect 2.2.1, a case is described in which the user terminal concatenates and codes (joint coding) a plurality of pieces of UCI (for example, UCI for URLLC and UCI for eMBB) of which the transmission timings (durations or slots) overlap each other.

In Aspect 2.2.1, the joint coding of a plurality of pieces of UCI (for example, UCI for URLLC and UCI for eMBB) may be performed for each UCI type. The UCI type indicates a combination of at least one of the SR, the HARQ-ACK, the CSI (CSI part 1 and/or CSI part 2).

Figure 9:
FIG. 9 is a diagram to show an example of transmission control of UCI in a user terminal according to Aspect 2.2.1.

FIG. 9 is a diagram to show an example of transmission control of the UCI in the user terminal according to Aspect 2.2.1. As shown in FIG. 9, the user terminal may concatenate the UCI for URLLC and the UCI for eMBB, perform, on the concatenated UCI, at least one of coding, interleaving, and rate matching, multiplex the resultant UCI with the data, and map the multiplexed UCI and data to the PUSCH. The PUSCH may be any of the PUSCH for URLLC or the PUSCH for eMBB.

In a case of concatenate and coding a plurality of pieces of UCI corresponding to a plurality of communications, the user terminal may combine forward the UCI for the higher priority communication. For example, in FIG. 9, the user terminal concatenates the UCI for URLLC and the UCI for eMBB, with the higher priority UCI for URLLC being forward and the lower priority UCI for eMBB being rearward.

In FIG. 9, in a case that the total number of bits of a plurality of pieces of UCI (for example, UCI for URLLC and UCI for eMBB) corresponding to a plurality of communications exceeds a certain threshold determined based on the maximum coding rate configured concerning the PUSCH, the user terminal may drop at least a portion of the plurality of pieces of UCI based on a certain rule. The total number of bits may or may not include cyclic redundancy check (CRC) bits.

For example, the certain rule may be defined based on at least one of a communication priority (for example, URLLC>eMBB) and a UCI type priority (for example, HARQ-ACK and/or SR>CSI).

Here, the above certain threshold may be determined based on, in addition to the maximum coding rate (r), at least one of the number of PRBs ($M^{PUCCH}_{RB}$), the number of symbols ($N^{PUCCH}_{symb}$), and a value ($Q_m$) based on a modulation scheme.

In a case that the maximum coding rate concerning the PUSCH is configured to each of the UCI for eMBB and the UCI for URLLC, the above certain threshold may be determined based on the maximum coding rate for the UCI for URLLC. This is because performance conditions are strictly configured for the maximum coding rate for the UCI for URLLC as compared to the maximum coding rate for the UCI for eMBB.

According to Aspect 2.2.1, in the case of joint coding a plurality of pieces of UCI (for example, UCI for URLLC and UCI for eMBB) of which the transmission timings (durations or slots) overlap each other, the user terminal can appropriately control the transmission of the plurality of pieces of UCI by using the PUSCH.

(Aspect 2.2.2)

In Aspect 2.2.2, a case is described in which the user terminal separately codes (separate coding) a plurality of pieces of UCI (for example, UCI for URLLC and UCI for eMBB) of which the transmission timings (durations or slots) overlap each other. The plurality of pieces of UCI (for example, UCI for URLLC and UCI for eMBB) may be the same UCI type (for example, CSI), or may be separately coded.

In Aspect 2.2.2, the maximum coding rate concerning the PUSCH may be configured for each of a plurality of communications (for example, UCI for eMBB and UCI for URLLC). The maximum coding rate may be configured separately for the data transmitted on the PUSCH and for the UCI. The maximum coding rate may be configured for each UCI type. For example, the maximum coding rate for an HARQ-ACK for URLLC and the maximum coding rate for the CSI for URLLC may be separately configured.

Figure 10:
FIG. 10 is a diagram to show an example of transmission control of UCI in a user terminal according to Aspect 2.2.2.

FIG. 10 is a diagram to show an example of transmission control of the UCI in the user terminal according to Aspect 2.2.2. As shown in FIG. 10, the user terminal may separately perform, on each of the UCI for URLLC and the UCI for eMBB, at least one of coding, interleaving, and rate matching, multiplex the resultant UCI with the data, and map the multiplexed UCI and data to the PUCCH. The PUSCH may be any of the PUSCH for URLLC or the PUSCH for eMBB.

The user terminal may drop (or multiplex on the PUSCH), based on a certain rule, at least a portion of the plurality of pieces of UCI separately coded. For example, the certain rule may be defined based on at least one of a communication priority (for example, URLLC>eMBB) and a UCI type priority (for example, HARQ-ACK and/or SR>CSI).

<Rule 1>

For example, in Rule 1, firstly, the user terminal multiplexes the UCI for URLLC on the PUSCH. In a case that the total number of bits of the UCI for URLLC multiplexed on the PUSCH exceeds a certain threshold based on the maximum coding rate configured for the UCI for URLLC, the user terminal drops a portion of the UCI for URLLC (for example, CSI (CSI part 2, or CSI parts 1 and 2)) and does not multiplex the UCI for eMBB on the PUSCH. Note that the total number of bits may or may not include the CRC bits.

On the other hand, in a case that the total number of bits of the UCI for URLLC multiplexed on the PUSCH does not exceed the above certain threshold, the user terminal further multiplexes the UCI for eMBB on the PUCCH. In a case that the total number of bits of the UCI for eMBB exceeds a certain threshold based on the maximum coding rate configured for the UCI for eMBB, the user terminal may drop a portion of the UCI for eMBB (for example, CSI (CSI part 2, or CSI parts 1 and 2)). Note that the total number of bits may or may not include the CRC bits.

<Rule 2>

In Rule 2, firstly, the user terminal multiplexes the HARQ-ACK for URLLC on the PUSCH. In a case that the total number of bits of the HARQ-ACK for URLLC multiplexed on the PUSCH exceeds a certain threshold based on the maximum coding rate configured for the UCI for URLLC, the user terminal may bundle the HARQ-ACK for URLLC in at least one of the time, frequency, and spatial domains, and may not multiplex the UCI for eMBB on the PUSCH. Note that the total number of bits may or may not include the CRC bits.

On the other hand, in a case that the total number of bits of the HARQ-ACK for URLLC multiplexed on the PUSCH does not exceed the above certain threshold, the user terminal further multiplexes the HARQ-ACK for eMBB. In a case that the total number of bits of the HARQ-ACK for eMBB exceeds a certain threshold based on the maximum coding rate configured for the UCI for eMBB, the HARQ-ACK for eMBB may be bundled in at least one of the time, frequency, and spatial domains, or at least a portion of the UCI for eMBB may be dropped. Note that the total number of bits may or may not include the CRC bits.

In a case that the total number of bits of the HARQ-ACK for eMBB does not exceed a certain threshold based on the maximum coding rate configured for the UCI for eMBB, the user terminal may multiplex at least a portion of the CSI for URLLC (for example, CSI part 1, or CSI parts 1 and 2) not to exceed the coding rate configured for the UCI for URLLC. Note that the total number of bits may or may not include the CRC bits.

Note that in Rule 2, the maximum coding rate configured for the UCI for URLLC may be a maximum coding rate configured for each UCI type. In other words, the total number of bits of the HARQ-ACK for URLLC multiplexed on the PUSCH may be compared with a certain threshold based on the maximum coding rate configured for the HARQ-ACK for URLLC. The total number of bits of the CSI for URLLC may be compared with a certain threshold based on the maximum coding rate configured for the CSI for URLLC. Note that the total number of bits may or may not include the CRC bits.

Similarly, in Rule 2, the maximum coding rate configured for the UCI for eMBB may be a maximum coding rate configured for each UCI type. In other words, the total number of bits of the HARQ-ACK for eMBB multiplexed on the PUCCH may be compared with a certain threshold based on the maximum coding rate configured for the HARQ-ACK for eMBB. Note that the total number of bits may or may not include the CRC bits.

According to Aspect 2.2.2, in the case of separate coding a plurality of pieces of UCI (for example, UCI for URLLC and UCI for eMBB) of which the transmission timings (durations or slots) overlap each other, the user terminal can appropriately control the transmission of the plurality of pieces of UCI by using the PUSCH.

(Aspect 2.3)

In Aspect 2.3, modification examples of Aspects 2.1 and 2.2 are described. In Aspects 2.1 and 2.2, the PUSCH used to transmit at least a portion a plurality of pieces of UCI (for example, UCI for URLLC and UCI for eMBB) corresponding to different communications may be a PUSCH scheduled for data of any communication.

For example, in Aspect 2.1, in a case of transmitting the UCI for eMBB or the UCI for URLLC, the following cases are assumed.

Case 1: UCI for eMBB is piggybacked on a PUSCH conveying uplink data for eMBB (PUSCH for eMBB)

Case 2: UCI for URLLC is piggybacked on a PUSCH conveying uplink data for URLLC (PUSCH for URLLC)

Case 3: UCI for eMBB is piggybacked on a PUSCH conveying uplink data for URLLC (PUSCH for URLLC)

Case 4: UCI for URLLC is piggybacked on a PUSCH conveying uplink data for eMBB (PUSCH for eMBB)

A pattern and/or amount of resources to which each piece of UCI is mapped may be different for the above cases. For example, the amount of the resources to which the UCI is mapped (for example, the number of resource elements (REs)) may be controlled such that the larger amount is controlled in order of Case 4>Case 2>Case 1>Case 3.

In Case 4, the user terminal may drop at least a portion of the uplink data for eMBB to transmit the UCI for URLLC by using the PUSCH for eMBB. In Case 3, the user terminal may drop at least a portion of the UCI for eMBB to transmit the uplink data for URLLC by using the PUSCH for URLLC.

In Aspect 2.2 also, in a case of transmitting at least a portion of the UCI for URLLC and the UCI for eMBB, the following cases are assumed.

Case 5: at least a portion of UCI for URLLC and UCI for eMBB is piggybacked on a PUSCH conveying uplink data for eMBB (PUSCH for eMBB)

Case 6: at least a portion of UCI for URLLC and UCI for eMBB is piggybacked on a PUSCH conveying uplink data for URLLC (PUSCH for URLLC)

A pattern and/or amount of resources to which at least a portion of the UCI for URLLC and the UCI for eMBB is mapped may be different for the above cases. For example, the amount of the resources to which the UCI is mapped (for example, the number of REs) may be controlled such that the larger amount is controlled in order of Case 5>Case 6.

In Case 5, the user terminal may drop at least a portion of the uplink data for eMBB to transmit at least a portion of the UCI for URLLC and the UCI for eMBB by using the PUSCH for eMBB. In Case 6, the user terminal may drop at least a portion of the UCI for eMBB to transmit the uplink data for URLLC by using the PUSCH for URLLC.

(Aspect 3)

In Aspect 3, a description is given of a case that simultaneous transmission of the PUCCH and the PUSCH for the same or different communications is allowed, and a case that simultaneous transmission of a plurality of PUSCHs or PUCCHs for different communications is allowed. Whether or not these simultaneous transmissions are allowed may be configured for the user terminal through higher layer signaling.

Here, a plurality of PUCCHs for different communications may be a plurality of PUCCHs which are different in at least one of a coding rate for the UCI, a duration (the number of symbols), and a mapping pattern of demodulation reference signals (DMRSs). Hereinafter, the PUCCH for URLLC and the PUCCH for eMBB are exemplified, but the present embodiment is not limited to these.

A plurality of PUSCHs for different communications may be a plurality of PUSCHs which are different in at least one of a coding rate for the uplink data, a duration (the number of symbols), and a mapping pattern of demodulation reference signals (DMRSs). Hereinafter, the PUSCH for URLLC and the PUSCH for eMBB are exemplified, but the present embodiment is not limited to these.

For example, in a case that the simultaneous transmission of the PUSCH for URLLC and the PUCCH for URLLC is allowed for the same carrier (in a single carrier) or different carriers (between a plurality of carriers), the user terminal may transmit the UCI for URLLC by using the PUCCH for URLLC. In this case, the user terminal may transmit the UCI for eMBB by using any of the PUCCH for URLLC and the PUSCH for URLLC. Note that in a case that the UCI type of the UCI for eMBB is CSI, the UCI for eMBB may be dropped.

In a case that the simultaneous transmission of the PUSCH for URLLC and the PUCCH for eMBB is allowed for the same carrier or different carriers, the user terminal may transmit the UCI for eMBB by using the PUCCH for eMBB. In this case, the user terminal may transmit the UCI for URLLC by using the PUCCH for eMBB, or may piggyback the UCI for URLLC on the PUSCH for URLLC to transmit the piggybacked UCI for URLLC.

In a case that the simultaneous transmission of the PUSCH for URLLC and the PUSCH for eMBB is allowed for the same carrier or different carriers, the user terminal may transmit the UCI for eMBB by using the PUSCH for eMBB. In this case, if the PUCCH for eMBB is present, the user terminal may transmit the UCI for URLLC by using the PUCCH for eMBB, or the user terminal may piggyback the UCI for URLLC on the PUSCH for URLLC to transmit the piggybacked UCI for URLLC.

In a case that the simultaneous transmission of the PUSCH for eMBB and the PUCCH for eMBB is allowed for the same carrier or different carriers, the user terminal may transmit the UCI for URLLC and the UCI for eMBB by using the PUCCH for eMBB.

In a case that the simultaneous transmission of the PUSCH for eMBB and the PUCCH for URLLC is allowed for the same carrier or different carriers, the user terminal may transmit the UCI for URLLC by using the PUCCH for URLLC. In this case, the user terminal may transmit the UCI for eMBB by using any of the PUCCH for URLLC and the PUSCH for eMBB.

In a case that the simultaneous transmission of the PUCCH for eMBB and the PUCCH for URLLC is allowed for the same carrier or different carriers, the user terminal may transmit the UCI for URLLC by using the PUCCH for URLLC. In this case, the user terminal may transmit the UCI for eMBB by using the PUCCH for eMBB.

In Aspect 3, the transmission of the UCI can be appropriately controlled in the case that the simultaneous transmission of the PUCCH and the PUSCH for the same communication or different communications is allowed and in the case that the simultaneous transmission of a plurality of PUSCHs or PUCCHs for different communications is allowed.

(Radio Communication System)

Hereinafter, a structure of a radio communication system according to the present embodiment will be described. In this radio communication system, a radio communication method according to each of the above aspects described above is adopted. Note that the radio communication method according to each of the above aspects may be adopted independently or at least two of aspects may be adopted in combination.

Figure 11:
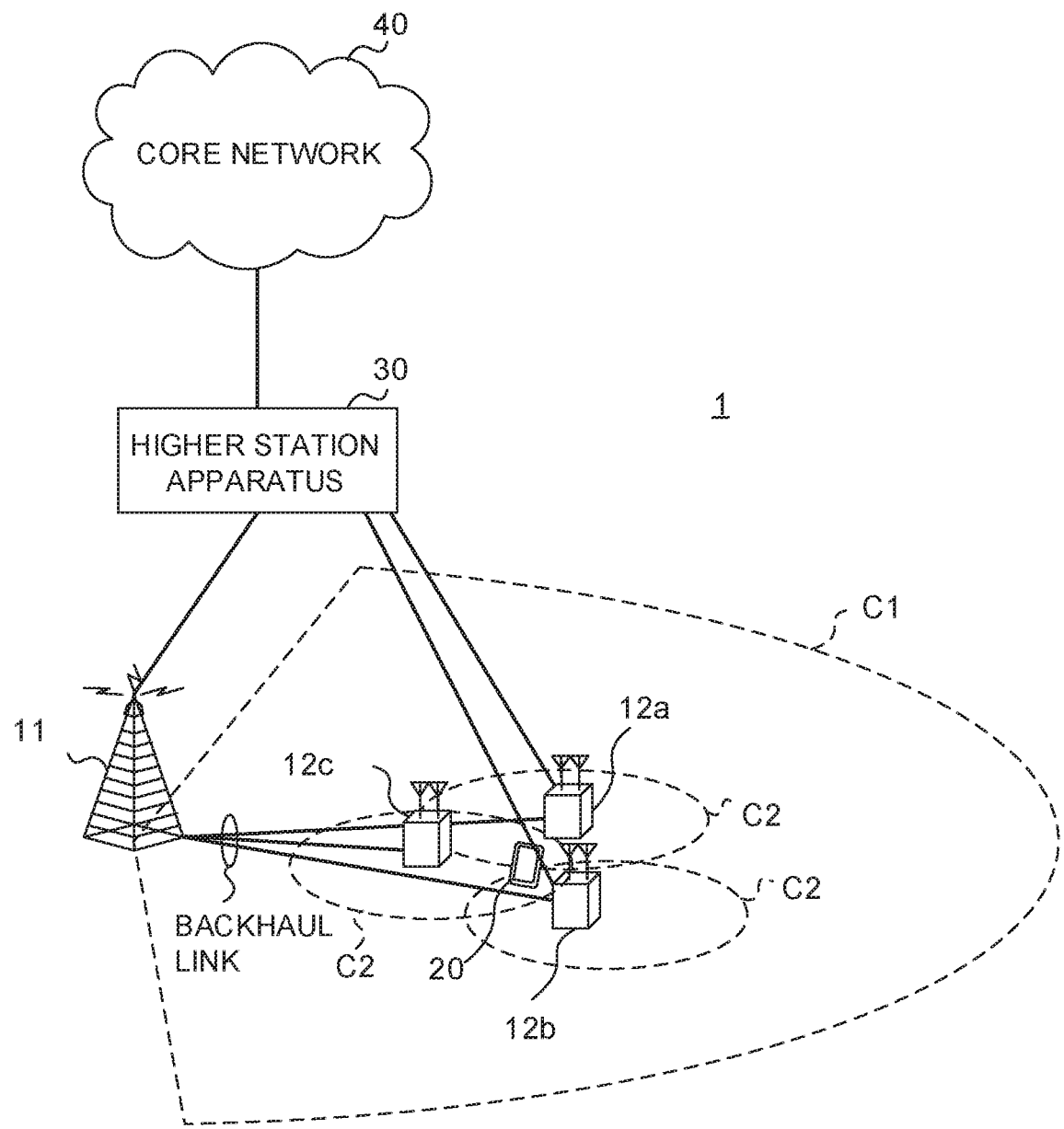
FIG. 11 is a diagram to show an example of a schematic structure of a radio communication system according to the present embodiment.

FIG. 11 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit. Note that the radio communication system 1 may be referred to as SUPER 3G, LTE-A (LTE-Advanced), IMT-Advanced, 4G, 5G, FRA (Future Radio Access), NR (New RAT (New Radio Access Technology)), and the like.

The radio communication system 1 shown in FIG. 11 includes a radio base station 11 that forms a macro cell C1, and radio base stations 12*a* to 12*c* that form small cells C2, which are placed within the macro cell C1 and which are narrower than the macro cell C1. Also, user terminals 20 are placed in the macro cell C1 and in each small cell C2. Numerologies different from each other between the cells and/or in the cells may be adopted.

The term "numerology" may refer to communication parameters in a frequency direction and/or a time direction (for example, at least one of a spacing for a subcarrier (subcarrier spacing), a bandwidth, a symbol length, a time length of a CP (CP length), a subframe length, a time length of a TTI (TTI length), the number of symbols per TTI, a radio frame structure, a filtering process, a windowing process, and so on). In the radio communication system 1, for example, the subcarrier spacing such as of 15 kHz, 30 kHz, 60 kHz, 120 kHz, 240 kHz, and the like may be supported.

Each user terminal 20 can connect with both the radio base station 11 and the radio base stations 12. The user terminal 20 is assumed to use the macro cell C1 and the small cells C2 that use different frequency, at the same time by means of CA or DC. Also, the user terminal 20 may adopt CA or DC by using a plurality of cells (CCs) (for example, two or more CCs). The user terminal can also use a licensed band CC and an unlicensed band CC as the plurality of cells.

The user terminal 20 can perform communication by using time division duplex (TDD) or frequency division duplex (FDD) in each cell. A TDD cell and an FDD cell may be also referred to as a TDD carrier (frame structure type 2) and an FDD carrier (frame structure type 1), respectively, or the like.

Furthermore, in each cell (carrier), a single numerology may be employed, or a plurality of different numerologies may be employed.

Between the user terminals 20 and the radio base station 11, communication can be carried out by using a carrier of a relatively low frequency band (for example, 2 GHz) and a narrow bandwidth (referred to as an "existing carrier," a "Legacy carrier," and so on). Meanwhile, between the user terminals 20 and the radio base stations 12, a carrier of a relatively high frequency band (for example, 3.5 GHz, 5 GHz, 30 to 70 GHz, and so on) and a wide bandwidth may be used, or the same carrier as that used between the user terminals 20 and the radio base station 11 may be used. Note that the structure of the frequency band for use in each radio base station is by no means limited to these.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "gNB (gNodeB)," a "transmitting/receiving point (TRP)" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "eNBs," "gNBs," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE, LTE-A, 5G, and NR and may include not only mobile communication terminals but stationary communication terminals. The user terminal 20 can also perform device-to device (D2D) communication with another user terminal 20.

In the radio communication system 1, as radio access schemes, an OFDMA (orthogonal frequency division multiple access) can be applied to the downlink (DL), and an SC-FDMA (single-carrier frequency division multiple access) can be applied to the uplink (UL). OFDMA is a multi-carrier communication scheme to perform communication by dividing a frequency band into a plurality of narrow frequency bands (subcarriers) and mapping data to each subcarrier. SC-FDMA is a single carrier communication scheme to reduce interference between terminals by dividing the system bandwidth into bands including one or continuous resource blocks per terminal, and allowing a plurality of terminals to use mutually different bands. Note that the uplink and downlink radio access schemes are not limited to the combinations of these, and the OFDMA may be used for the UL.

In the radio communication system 1, a multi-carrier waveform (for example, OFDM waveform) may be used, or a single-carrier waveform (for example, DFT-s-OFDM waveform) may be used.

In the radio communication system 1, a DL shared channel (also referred to as PDSCH (Physical Downlink Shared Channel), downlink data channel, or the like), which is used by each user terminal 20 on a shared basis, a broadcast channel (PBCH (Physical Broadcast Channel)), L1/L2 control channels and so on, are used as DL channels. User data, higher layer control information, SIBs (System Information Blocks) and so on are conveyed on the PDSCH. MIBs (Master Information Blocks) are conveyed on the PBCH.

The L1/L2 control channels include a downlink control channel (a PDCCH (Physical Downlink Control Channel), an EPDCCH (Enhanced Physical Downlink Control Channel)), a PCFICH (Physical Control Format Indicator Channel), a PHICH (Physical Hybrid-ARQ Indicator Channel) and so on. The downlink control information (DCI) including PDSCH and PUSCH scheduling information, and so on are conveyed on the PDCCH. The number of OFDM symbols used for the PDCCH is conveyed on the PCFICH. The EPDCCH is frequency-division multiplexed with the PDSCH and used to convey the DCI and so on, like the PDCCH. HARQ acknowledgment information (ACK/NACK) for the PUSCH can be conveyed on at least one of the PHICH, the PDCCH, and the EPDCCH.

In the radio communication system 1, an uplink shared channel (also referred to as PUSCH (Physical Uplink Shared Channel), uplink data channel, or the like), which is used by each user terminal 20 on a shared basis, an uplink control channel (PUCCH (Physical Uplink Control Channel)), a random access channel (PRACH (Physical Random Access Channel)) and so on are used as uplink (UL) channels. User data and higher layer control information are conveyed on the PUSCH. The uplink control information (UCI) including at least one of acknowledgment information (A/N) for downlink (DL) signals, the channel state information (CSI), and the like is conveyed on the PUSCH or PUCCH. Random access preambles for establishing connections with cells can be conveyed on the PRACH.

<Radio Base Station>

Figure 12:
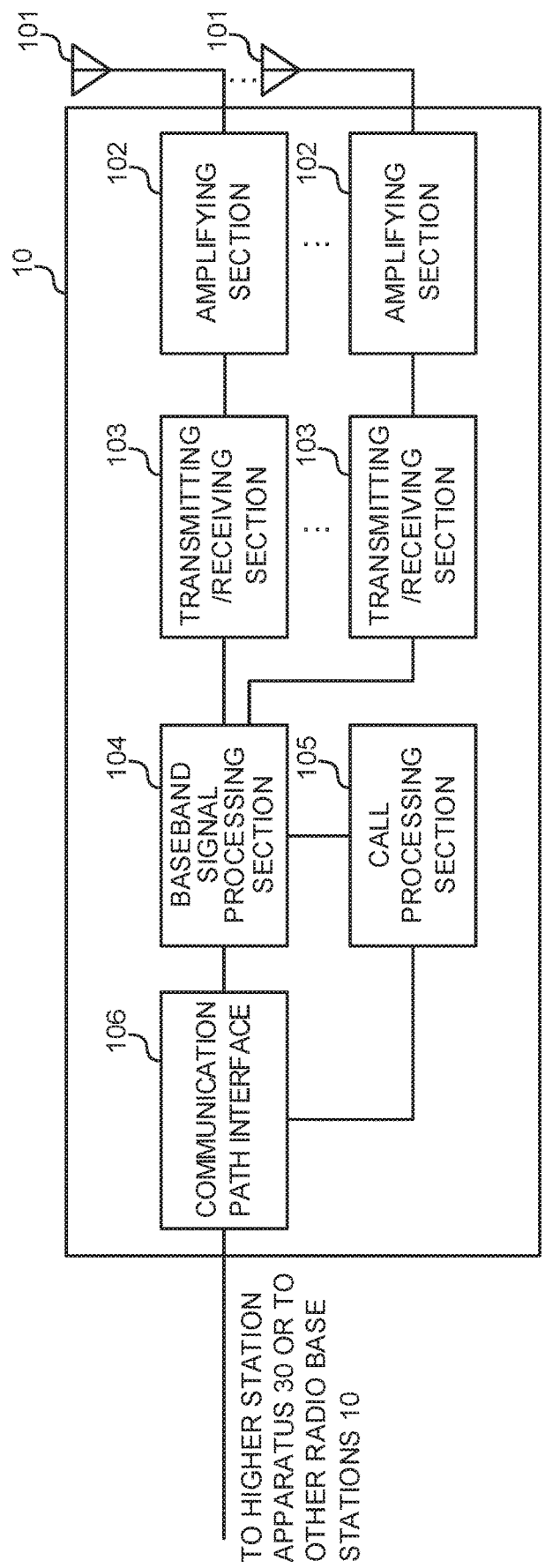
FIG. 12 is a diagram to show an example of an overall structure of the radio base station according to the present embodiment.

FIG. 12 is a diagram to show an example of an overall structure of the radio base station according to the present embodiment. The radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmitting processes, such as a PDCP (Packet Data Convergence Protocol) layer process, division and coupling of the user data, RLC (Radio Link Control) layer transmitting processes such as RLC retransmission control, MAC (Medium Access Control) retransmission control (for example, an HARQ (Hybrid Automatic Repeat reQuest) transmitting process), scheduling, transport format selection, channel coding, an inverse fast Fourier transform (IFFT) process, and a precoding process, and the resultant is forwarded to each transmitting/receiving section 103. Furthermore, the downlink control signals are also subjected to transmitting processes such as channel coding and inverse fast Fourier transform, and the resultant is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink (UL) signals, radio frequency signals that are received in the transmitting/receiving antennas 101 are amplified in the amplifying sections 102. The transmitting/receiving sections 103 receive the UL signals amplified in the amplifying sections 102. The transmitting/receiving sections 103 convert the received signals into the baseband signal through frequency conversion and outputs to the baseband signal processing section 104.

In the baseband signal processing section 104, the UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing such as setting up and releasing the communication channels, manages the state of the radio base station 10, manages the radio resources.

The transmission line interface 106 transmits and/or receives signals to and/or from the higher station apparatus 30 via a certain interface. Also, the transmission line interface 106 may transmit and/or receive signals (backhaul signaling) with neighboring radio base stations 10 via an inter-base station interface (for example, an optical fiber in compliance with the CPRI (common public radio interface) and an X2 interface).

The transmitting/receiving sections 103 transmit the downlink (DL) signals (including at least one of DL data signal, DL control signal, and DL reference signal) to the user terminals 20, and receive the uplink (UL) signals (including at least one of UL data signal, UL control signal, and UL reference signal) from the user terminals 20.

The transmitting/receiving sections 103 receive the UCI from the user terminals 20 by using the uplink shared channel (for example, PUSCH) or the uplink control channel. The transmitting/receiving sections 103 may receive a plurality of pieces of UCI (for example, UCI for eMBB and UCI for URLLC) corresponding to a plurality of communications.

The transmitting/receiving sections 103 transmit the control information through higher layer signaling (higher layer control information) and the downlink control information (DCI) through physical layer signaling. Specifically, the transmitting/receiving sections 103 may transmit the maximum coding rate information indicating the maximum coding rate for the uplink control channel format or the uplink shared channel.

Figure 13:
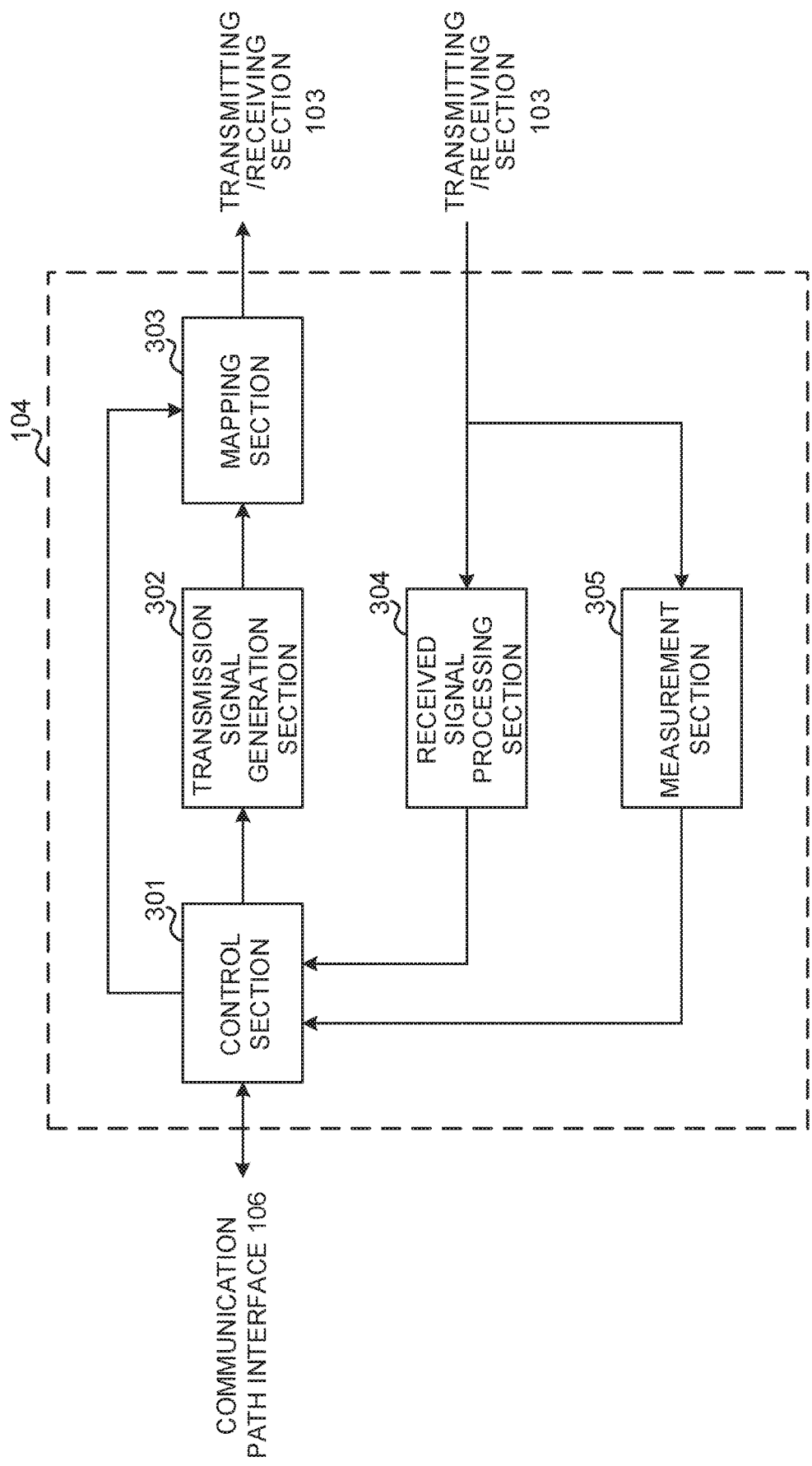
FIG. 13 is a diagram to show an example of a functional structure of the radio base station according to the present embodiment.

FIG. 13 is a diagram to show an example of a functional structure of the radio base station according to the present embodiment. Note that, FIG. 13 primarily shows functional blocks that pertain to characteristic parts of the present embodiment, and the radio base station 10 may also include other functional blocks that are necessary for radio communication as well. As shown in FIG. 13, the baseband signal processing section 104 includes a control section 301, a transmission signal generation section 302, a mapping section 303, a received signal processing section 304, and a measurement section 305.

The control section 301 controls the whole of the radio base station 10. The control section 301 controls, for example, DL signal generation in the transmission signal generation section 302, DL signal mapping in the mapping section 303, a UL signal receiving process in the received signal processing section 304 (for example, demodulation or the like), and measurement in the measurement section 305.

Specifically, the control section 301 performs scheduling of the user terminal 20. Specifically, the control section 301 may perform scheduling and/or retransmission control of the downlink shared channel and/or the uplink shared channel.

For example, the control section 301 may control scheduling of at least one of the plurality of communications such that the transmission timings of the plurality of pieces of UCI (for example, UCI for eMBB and UCI for URLLC) in the user terminal 20 do not overlap each other (Aspect 1.1, Aspect 2.1).

The control section 301 may control, based on the transmission timing of the UCI for a specific communication (for example, UCI for eMBB (or UCI for URLLC)), scheduling of the downlink shared channel for another communication (for example, URLLC (or eMBB)) to the user terminal (Aspect 1.1, Aspect 2.1).

The control section 301 may control, based on the transmission timing of the UCI for a specific communication (for example, UCI for eMBB (or UCI for URLLC)), scheduling of the uplink shared channel for another communication (for example, URLLC (or eMBB)) to the user terminal (Aspect 1.1, Aspect 2.1).

The control section 301 may control, based on the transmission timing of the UCI for a specific communication (for example, UCI for eMBB (or UCI for URLLC)), a trigger for an aperiodic channel state information for another communication (for example, URLLC (or eMBB)) to the user terminal (Aspect 1.1, Aspect 2.1).

The control section 301 may control, based on the transmission timing of the UCI for a specific communication (for example, UCI for eMBB (or UCI for URLLC)), a transmission timing of the acknowledgment information for the downlink shared channel for another communication (for example, URLLC (or eMBB)) to the user terminal (Aspect 1.1, Aspect 2.1).

The control section 301 may control the pattern and/or amount of the resources to which each piece of UCI is mapped, based on that the UCI for what communication is transmitted by using a PUSCH for what communication (Aspect 2.3).

The control section 301 may control whether to allow the simultaneous transmission of the PUCCH and PUSCH for the same or different communications and/or whether to allow the simultaneous transmission of a plurality of PUSCHs or PUCCHs for different communications (Aspect 3).

The control section 301 may control a structure (format) and/or resources of an uplink control channel and control to transmit control information related to the uplink control channel (for example, information indicating the format and/or the resources, or the like).

The control section 301 may control the coding rate (for example, the maximum coding rate) for the UCI in first and second uplink control channels to control the transmission of the maximum coding rate information.

The control section 301 may control the received signal processing section 304 to perform a receiving process on the UCI from the user terminal 20 based on the uplink control channel format.

The control section 301 can be constituted with a controller, a control circuit or control apparatus that can be described based on general understanding of the technical field to which the present invention pertains.

The transmission signal generation section 302 generates DL signals (including DL data signals, DL control signals, DL reference signals and so on), based on commands from the control section 301 and outputs the generated DL signals to the mapping section 303.

The transmission signal generation section 302 can be constituted with a signal generator, a signal generation circuit or signal generation apparatus that can be described based on general understanding of the technical field to which the present invention pertains.

The mapping section 303 maps the DL signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present invention pertains.

The received signal processing section 304 performs a receiving process (for example, demapping, demodulation, and decoding, and so on) of the UL signals (for example, including UL data signals, UL control signals, and UL reference signals) transmitted from the user terminal 20. Specifically, the received signal processing section 304 may output the received signals and the signals after the receiving process to the measurement section 305. The received signal processing section 304 performs the receiving process on the UCI, based on the uplink control channel structure indicated by the control section 301.

The measurement section 305 conducts measurements with respect to the received signals. The measurement section 305 can be constituted with a measurer, a measurement circuit or measurement apparatus that can be described based on general understanding of the technical field to which the present invention pertains.

The measurement section 305 may measure UL channel quality, based on, for example, received power of UL reference signal (for example, RSRP (Reference Signal Received Power)) and/or received quality of UL reference signal (for example, RSRQ (Reference Signal Received Quality)). The measurement results may be output to the control section 301.

<User Terminal>

Figure 14:
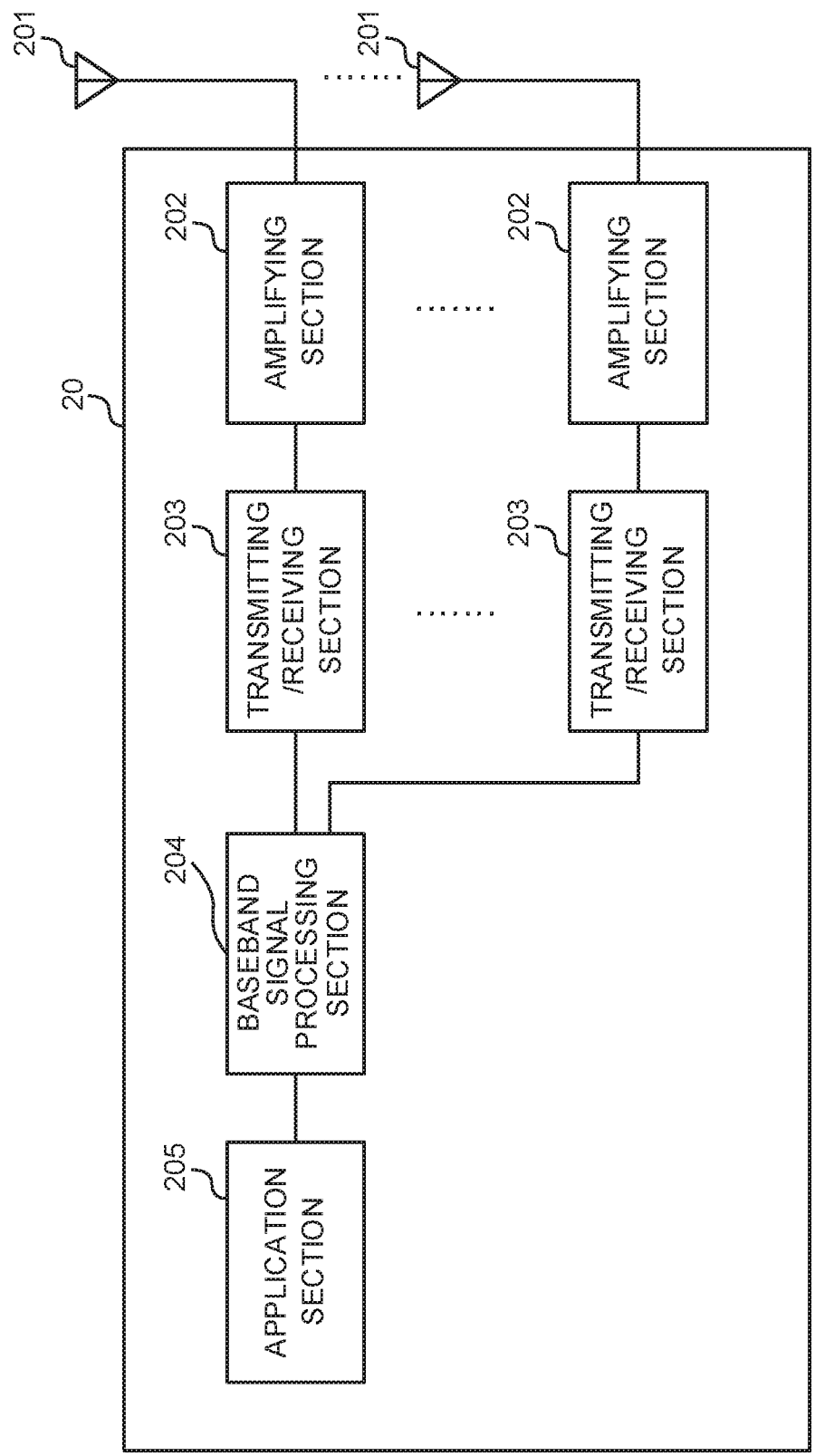
FIG. 14 is a diagram to show an example of an overall structure of a user terminal according to the present embodiment.

FIG. 14 is a diagram to show an example of an overall structure of the user terminal according to the present embodiment. The user terminal 20 includes a plurality of transmitting/receiving antennas 201 for MIMO communication, amplifying sections 202, transmitting/receiving sections 203, a baseband signal processing section 204, and an application section 205.

Radio frequency signals that are received via the plurality of transmitting/receiving antennas 201 are amplified in the amplifying sections 202. The transmitting/receiving sections 203 receive the DL signals amplified in the amplifying sections 202. The transmitting/receiving sections 203 convert the received signals into baseband signals through frequency conversion, and output the baseband signals to the baseband signal processing section 204.

The baseband signal processing section 204 performs, on each input baseband signal, an FFT process, error correction decoding, a retransmission control receiving process, and so on. The DL data is forwarded to the application section 205. The application section 205 performs processes related to higher layers above the physical layer and the MAC layer, and so on. The broadcast information is also forwarded to the application section 205.

Meanwhile, the uplink (UL) data is input from the application section 205 to the baseband signal processing section 204. The baseband signal processing section 204 performs a retransmission control transmitting process (for example, an HARQ transmitting process), channel coding, rate matching, puncturing, a discrete Fourier transform (DFT) process, an IFFT process, and so on, and the resultant is forwarded to the transmitting/receiving sections 203. The UCI is also subjected to at least one of channel coding, rate matching, puncturing, the DFT process, and the IFFT process, and the resultant is forwarded to the transmitting/receiving sections 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 receive the downlink (DL) signals (including DL data signal, DL control signal, and DL reference signal) of numerology configured for the user terminals 20, and transmit the uplink (UL) signals (including UL data signal, UL control signal, and UL reference signal) of that numerology.

The transmitting/receiving sections 203 transmit the UCI to the radio base station 10 by using the uplink shared channel (for example, PUSCH) or the uplink control channel. The transmitting/receiving sections 203 may transmit a plurality of pieces of UCI (for example, UCI for eMBB and UCI for URLLC) corresponding to a plurality of communications.

The transmitting/receiving sections 203 receives the control information through higher layer signaling (higher layer control information) and the downlink control information (DCI) through physical layer signaling. Specifically, the transmitting/receiving sections 203 may receive the maximum coding rate information indicating the maximum coding rate for the uplink control channel format or the uplink shared channel.

The transmitting/receiving sections 203 can be constituted with transmitters/receivers, transmitting/receiving circuits or transmitting/receiving apparatus that can be described based on general understanding of the technical field to which the present invention pertains. Each transmitting/receiving section 203 may be structured as a transmitting/receiving section in one entity, or may be constituted with a transmitting section and a receiving section.

Figure 15:
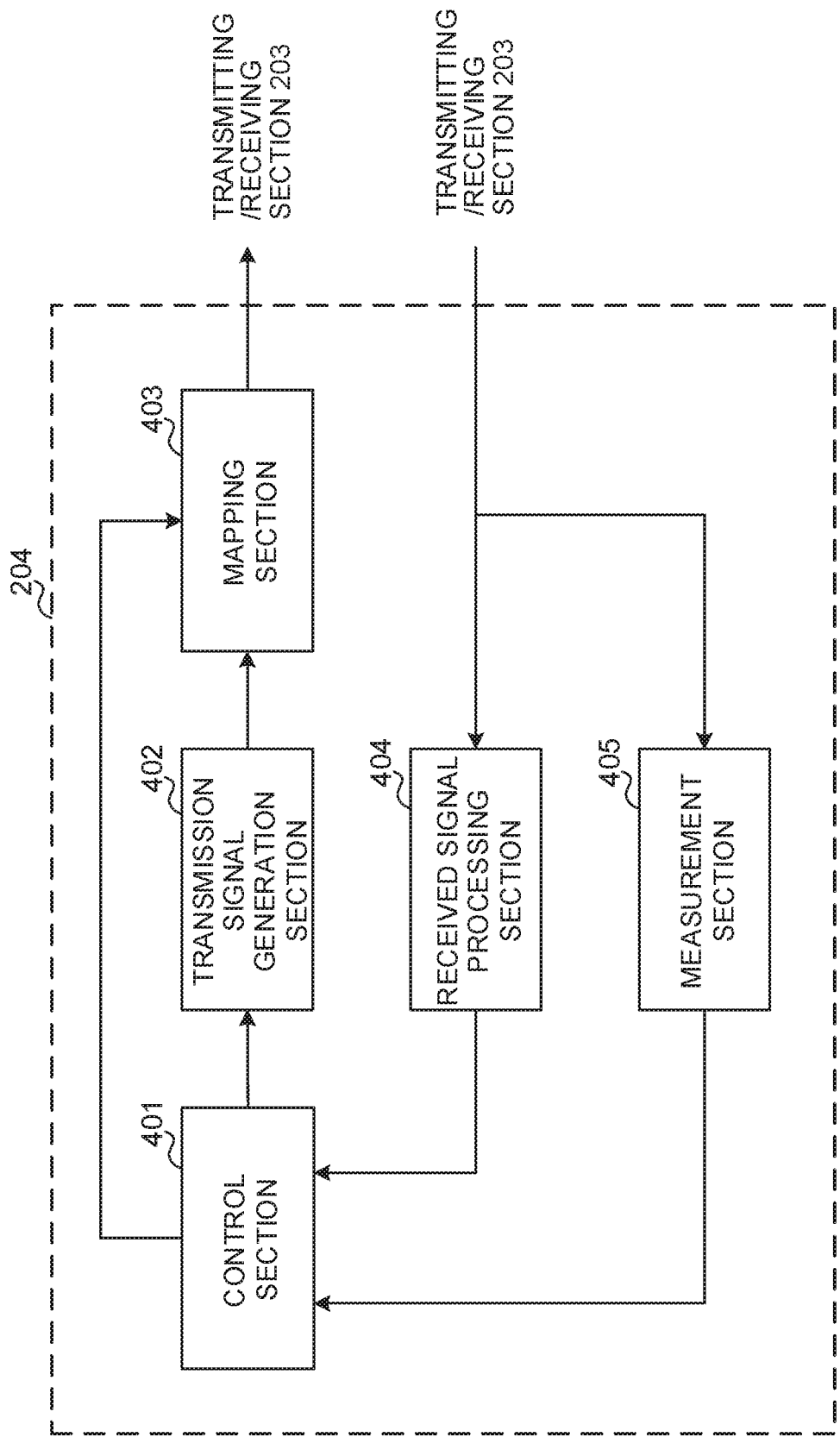
FIG. 15 is a diagram to show an example of a functional structure of the user terminal according to the present embodiment.

FIG. 15 is a diagram to show an example of a functional structure of the user terminal according to the present embodiment. Note that, FIG. 15 primarily shows functional blocks that pertain to characteristic parts of the present embodiment, and the user terminal 20 may also include other functional blocks that are necessary for radio communication as well. As shown in FIG. 15, the baseband signal processing section 204 included in the user terminal 20 includes a control section 401, a transmission signal generation section 402, a mapping section 403, a received signal processing section 404, and a measurement section 405.

The control section 401 controls the whole of the user terminal 20. The control section 401 controls, for example, UL signal generation in the transmission signal generation section 402, UL signal mapping in the mapping section 403, a DL signal receiving process in the received signal processing section 404, and measurement in the measurement section 405.

The control section 401 controls the uplink control channel used to transmit the UCI from the user terminal 20, based on an explicit indication from the radio base station 10 or an implicit determination in the user terminal 20.

The control section 401 may control the structure (format) of the uplink control channel (for example, long PUCCH and/or short PUCCH). The control section 401 may control the uplink control channel format based on the control information from the radio base station 10.

The control section 401 may control the transmission of the UCI, based on the maximum coding rate indicated by the maximum coding rate information received from the radio base station 10 (the maximum coding rate configured for the user terminal 20).

Specifically, the control section 401 may control the transmission of at least a portion of the UCI (for example, any of UCI for eMBB and UCI for URLLC) corresponding to a single communication at a timing (duration or slot), based on the maximum coding rate configured for the uplink control channel format or the uplink shared channel (Aspects 1.1 and 2.1).

In a case that the transmission timings of a plurality of pieces of UCI (for example, UCI for eMBB and UCI for URLLC) overlap each other, the control section 401 may control the transmission of at least a portion of the plurality of pieces of UCI, based on the maximum coding rate configured for the uplink control channel format or the uplink shared channel (Aspects 1.2 and 2.2).

In a case that the total number of bits of a plurality of pieces of UCI (for example, UCI for eMBB and UCI for URLLC) exceeds a certain threshold based on the maximum coding rate, the control section 401 may control drop of at least a portion of the plurality of pieces of UCI (Aspects 1.2.1 and 2.2.1). The total number of bits may or may not include the CRC bits.

The above maximum coding rate may be configured for each of the plurality of communications. In this case, in a case that the total number of bits of a plurality of pieces of UCI (for example, UCI for eMBB and UCI for URLLC) exceeds a certain threshold based on the maximum coding rate configured for a specific communication (for example, URLLC), the control section 401 may control drop of a portion of the plurality of pieces of UCI (Aspects 1.2.1 and 2.2.1). The specific communication may be higher priority communication.

The above maximum coding rate may be configured for each of the plurality of communications. In this case, in a case that the number of bits of the UCI (for example, UCI for URLLC) for a specific communication exceeds a certain threshold based on the maximum coding rate configured for the specific communication (for example, URLLC), the control section 401 may control drop of at least a portion of the UCI for the specific communication (Aspects 1.2.2 and 2.2.2). The number of bits of the UCI for the specific communication may or may not include the CRC bits.

In a case that the number of bits of the UCI (for example, UCI for URLLC) for a specific communication does not exceed a certain threshold based on the maximum coding rate configured for the specific communication, and the number of bits of the UCI (for example, UCI for eMBB) for another communication exceeds a certain threshold based on the maximum coding rate configured for the another communication (for example, eMBB), the control section 401 may control drop of at least a portion of the UCI for the another communication (Aspects 1.2.2 and 2.2.2). The number of bits of the UCI for another communication may or may not include the CRC bits.

The control section 401 may control the pattern and/or amount of the resources to which each piece of UCI is mapped, based on that the UCI for what communication is transmitted by using a PUSCH for what communication (Aspect 2.3).

In a case that the simultaneous transmission of the PUCCH and the PUSCH for the same communication or different communications is allowed and/or that the simultaneous transmission of a plurality of PUSCHs or PUCCHs for different communications is allowed, the control section 401 may control the transmission of at least a portion of a plurality of pieces of UCI (Aspect 3).

The control section 401 may determine a PUCCH resource used for the PUCCH format, based on higher layer signaling and/or downlink control information.

The control section 401 may control at least one of the transmission signal generation section 402, the mapping section 403, and the transmitting/receiving sections 203 to perform the transmission process of the UCI based on the PUCCH format.

The control section 401 can be constituted with a controller, a control circuit or control apparatus that can be described based on general understanding of the technical field to which the present invention pertains.

The transmission signal generation section 402 generates (for example, performs coding, rate matching, puncturing, modulation, and the like on) UL signals (including UL data signal, UL control signal, UL reference signal, and UCI), based on commands from the control section 401 and outputs the generated signals to the mapping section 403. The transmission signal generation section 402 can be constituted with a signal generator, a signal generation circuit or signal generation apparatus that can be described based on general understanding of the technical field to which the present invention pertains.

The mapping section 403 maps the UL signals generated in the transmission signal generation section 402 to radio resources, based on commands from the control section 401, and outputs the resultant to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding and so on) on the DL signals (DL data signal, scheduling information, DL control signal, DL reference signal). The received signal processing section 404 outputs the information received from the radio base station 10 to the control section 401. The received signal processing section 404 outputs, for example, broadcast information, system information, higher layer control information through higher layer signaling such as RRC signaling, physical layer control information (L1/L2 control information) and the like to the control section 401.

The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The measurement section 405 measures a channel state based on the reference signals from the radio base station 10 (for example, CSI-RS), and outputs the measurement result to the control section 401. Note that the channel state measurement may be performed for each CC.

The measurement section 405 can be constituted with a signal processor, a signal processing circuit or signal processing apparatus, and a measurer, a measurement circuit or measurement apparatus that can be described based on general understanding of the technical field to which the present invention pertains.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 16:
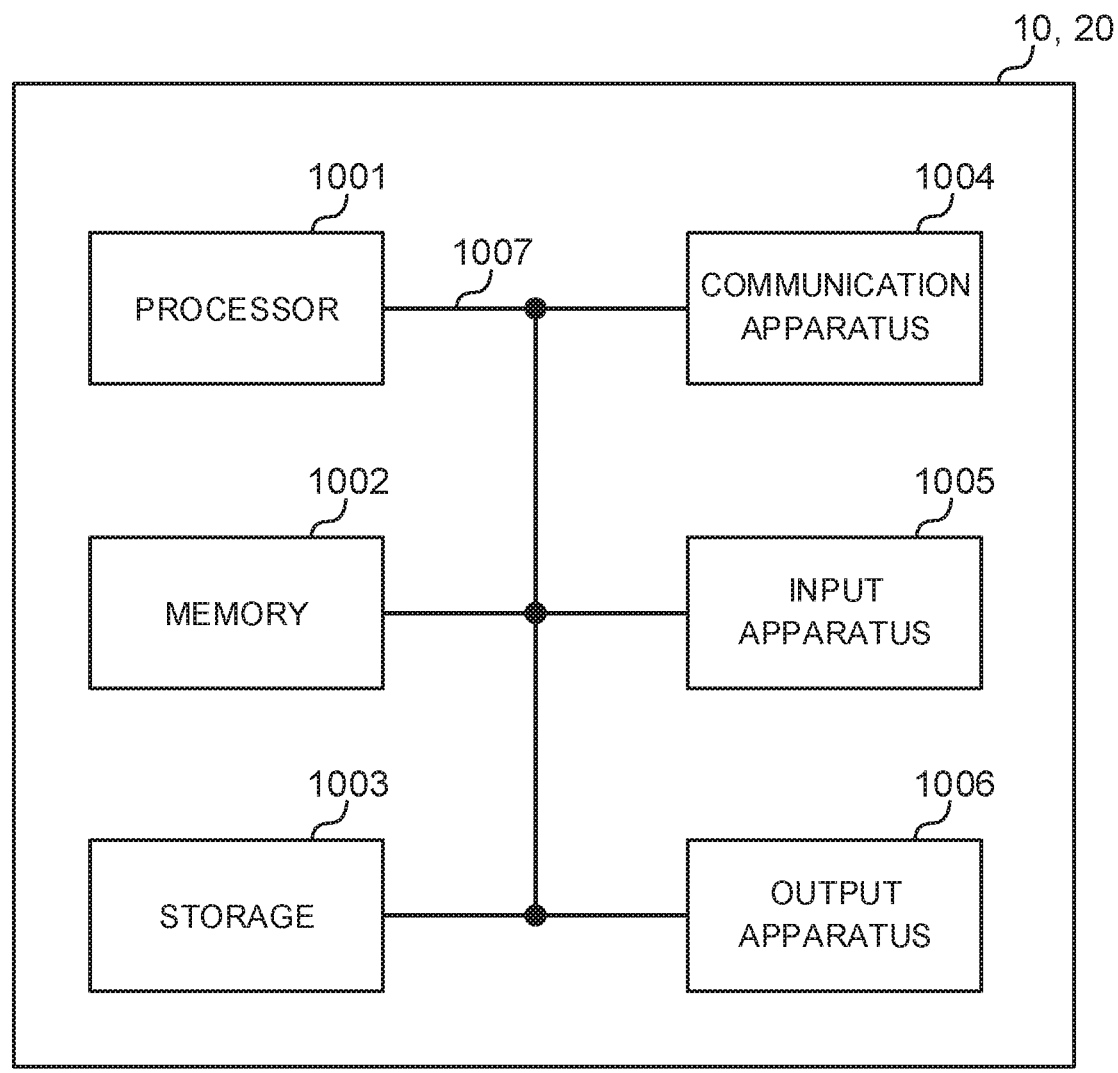
FIG. 16 is a diagram to show an example of a hardware structure of the radio base station and the user terminal according to the present embodiment.

For example, a radio base station, a user terminal, and so on according to one embodiment of the present invention may function as a computer that executes the processes of the radio communication method of the present invention. FIG. 16 is a diagram to show an example of a hardware structure of the radio base station and the user terminal according to the present embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via a wired and/or wireless network, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in this specification and/or the terminology that is needed to understand this specification may be replaced by other terms that convey the same or similar meanings. For example, "channels" and/or "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks, and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" used in this specification can be used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "transmitting/receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms in some cases.

A base station and/or a mobile station may be also referred to as a transmission apparatus, a reception apparatus, and so on.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GWs (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up, (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions and/or (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the present invention defined by the recitations of claims. Consequently, the description in this specification is provided only for the purpose of explaining examples, and should by no means be construed to limit the present invention in any way.

What is claimed is:

1. A terminal comprising:
    a transmitter that transmits a plurality of pieces of uplink control information (UCI) by using physical uplink control channels (PUCCHs) with different priorities; and
    a processor that controls at least one transmission of the plurality of pieces of UCI, based on a maximum coding rate configured for each of the PUCCHs with different priorities,
    wherein the processor controls, based on the maximum coding rate, to not transmit at least a part of channel state information (CSI) included in at least one of the plurality of pieces of UCI.

2. The terminal according to claim 1, wherein the maximum coding rate is reported through higher layer signaling.

3. A radio communication method for a terminal, comprising:
    transmitting a plurality of pieces of uplink control information (UCI) by using physical uplink control channels (PUCCHs) with different priorities; and
    controlling at least one transmission of the plurality of pieces of UCI, based on a maximum coding rate configured for each of the PUCCHs with different priorities, wherein the terminal controls, based on the maximum coding rate, to not transmit at least a part of channel state information (CSI) included in at least one of the plurality of pieces of UCI.

4. A system comprising a terminal and a base station, wherein the terminal comprises:
   a transmitter that transmits a plurality of pieces of uplink control information (UCI) by using physical uplink control channels (PUCCHs) with different priorities; and
   a processor that controls at least one transmission of the plurality of pieces of UCI, based on a maximum coding rate configured for each of the PUCCHs with different priorities,
   wherein the processor controls, based on the maximum coding rate, to not transmit at least a part of channel state information (CSI) included in at least one of the plurality of pieces of UCI, and
the base station comprises:
   a receiver that receives the PUCCHs with different priorities.

* * * * *